(12) United States Patent
Rothenberg

(10) Patent No.: US 7,068,884 B2
(45) Date of Patent: Jun. 27, 2006

(54) APODIZED FIBER BRAGG GRATING AND IMPROVED PHASE MASK, METHOD AND SYSTEM FOR MAKING THE SAME

(75) Inventor: Joshua E. Rothenberg, Los Angeles, CA (US)

(73) Assignee: Teraxion Inc., Sainte-Foy (CA)

( * ) Notice: Subject to any disclaimer, the term of this patent is extended or adjusted under 35 U.S.C. 154(b) by 98 days.

(21) Appl. No.: 10/789,374

(22) Filed: Feb. 27, 2004

(65) Prior Publication Data
US 2004/0264858 A1   Dec. 30, 2004

(30) Foreign Application Priority Data
Feb. 27, 2003   (CA) ................................. 2420521

(51) Int. Cl.
*G02B 6/34* (2006.01)
*H01L 21/00* (2006.01)
*C03B 37/23* (2006.01)

(52) U.S. Cl. ............................ 385/37; 438/32; 438/31; 65/385

(58) Field of Classification Search ................. 385/37; 438/31, 32; 65/385
See application file for complete search history.

(56) References Cited
U.S. PATENT DOCUMENTS
6,501,874 B1 * 12/2002 Frolov et al. .................. 385/27

| 6,654,521 B1 | 11/2003 | Sheng et al. |
| 6,753,118 B1 * | 6/2004 | Deshmukh et al. ........... 430/30 |
| 2004/0161196 A1 * | 8/2004 | Murashima et al. .......... 385/37 |

OTHER PUBLICATIONS

B. Malo et al., "Apodised in-fiber Bragg grating reflectors photoimprinted using a phase mask", Electronics Lett. Feb. 2, 1995, vol. 31, No. 3, pp. 223-225.
R. Kashyap, "Fiber Bragg Grating", Academic Press, 1999, pp. 195-227.
M.J. Cole, et al., "Moving Fibre/phase mask-scanning beam technique for enhanced flexibility in producing fibre gratings with uniform phase mask", Electr. Lett. Aug. 17, 1995, vol. 31, No. 17, pp. 1488-1490.
H.G. Frohlich et al., "Two methods of apodisation of fibre-Bragg-gratings", Optics Communications, 157 (1998), pp. 273-281.

(Continued)

*Primary Examiner*—Brian Healy
*Assistant Examiner*—Charlie Peng
(74) *Attorney, Agent, or Firm*—Darby & Darby

(57) ABSTRACT

An apodized fiber Bragg grating, and a phase mask, method and system for making such a grating are disclosed. The refractive index profile of the grating has a periodic apodization phase component which is designed so that the grating fringes reflecting light in a spectral region of interest are apodized, by generating spurious reflection features outside of this spectral region of interest. Apodization is therefore provided through a phase variation of the grating as opposed to an amplitude variation. The phase component is added to the profile of the phase mask grating corrugations to obtain the phase-apodized grating.

18 Claims, 20 Drawing Sheets

OTHER PUBLICATIONS

R. Kashyap et al., "Simple technique for apodising chirped and unchirped fibre Bragg gratings", Elect. Lett. Jun. 20, 1996, vol. 32, No. 13, pp. 1226-1228.

J. Albert et al., Apodisation of the spectral response of fibre Bragg gratings using a phase mask with variable diffraction efficiency, Elect. Lett. Feb. 2, 1995, vol. 31, No. 3, pp. 222-223.

J. Albert et al., "Moire phase masks for automatic pure apodisation of fibre Bragg gratings", Elect. Lett. Nov. 21, 1996, vol. 32, No. 24, pp. 2260-2261.

* cited by examiner

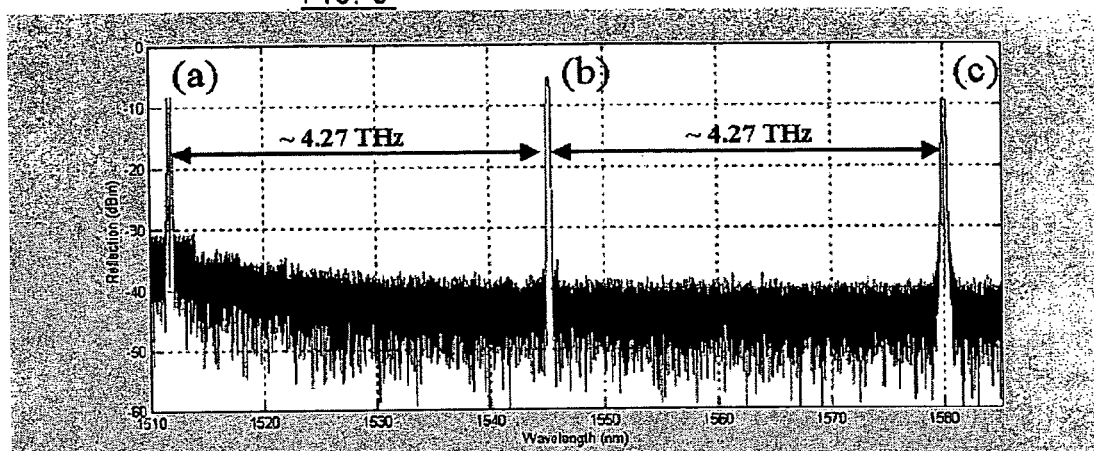
FIG. 5
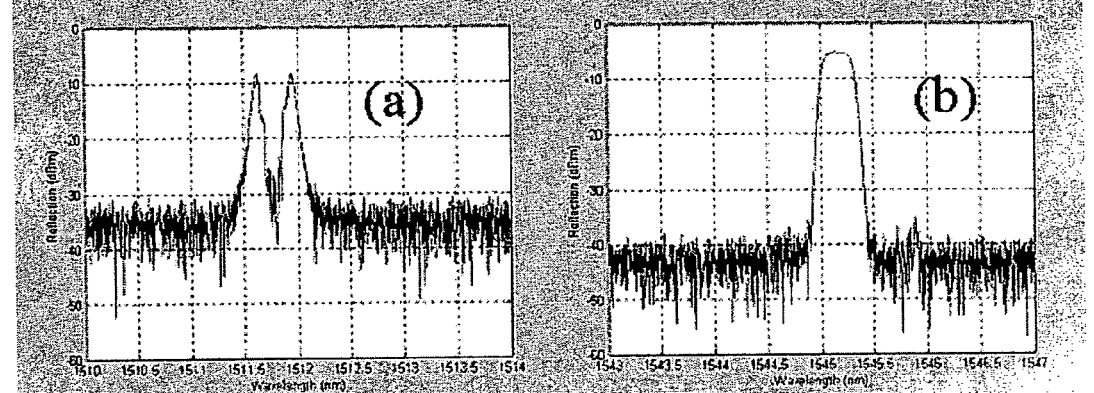
FIG. 5A
FIG. 5B
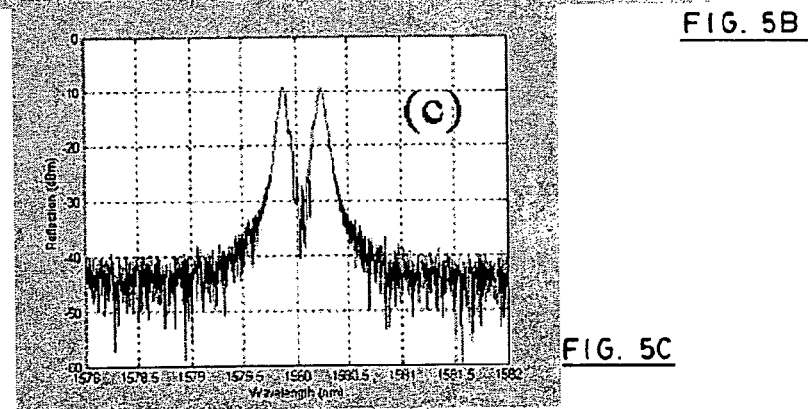
FIG. 5C

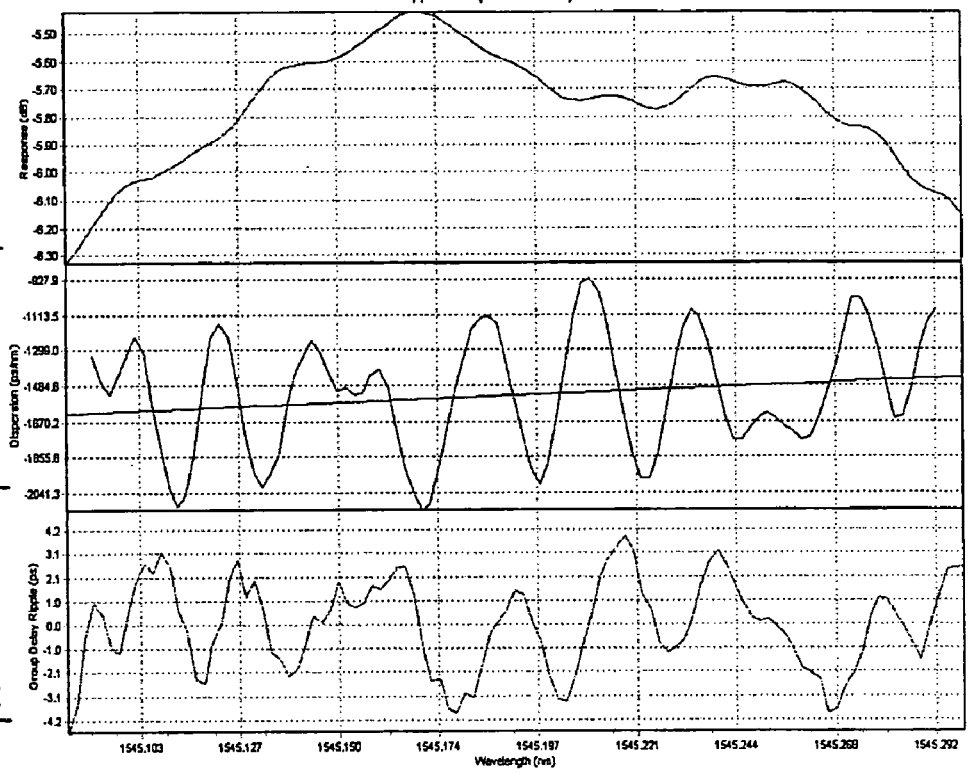

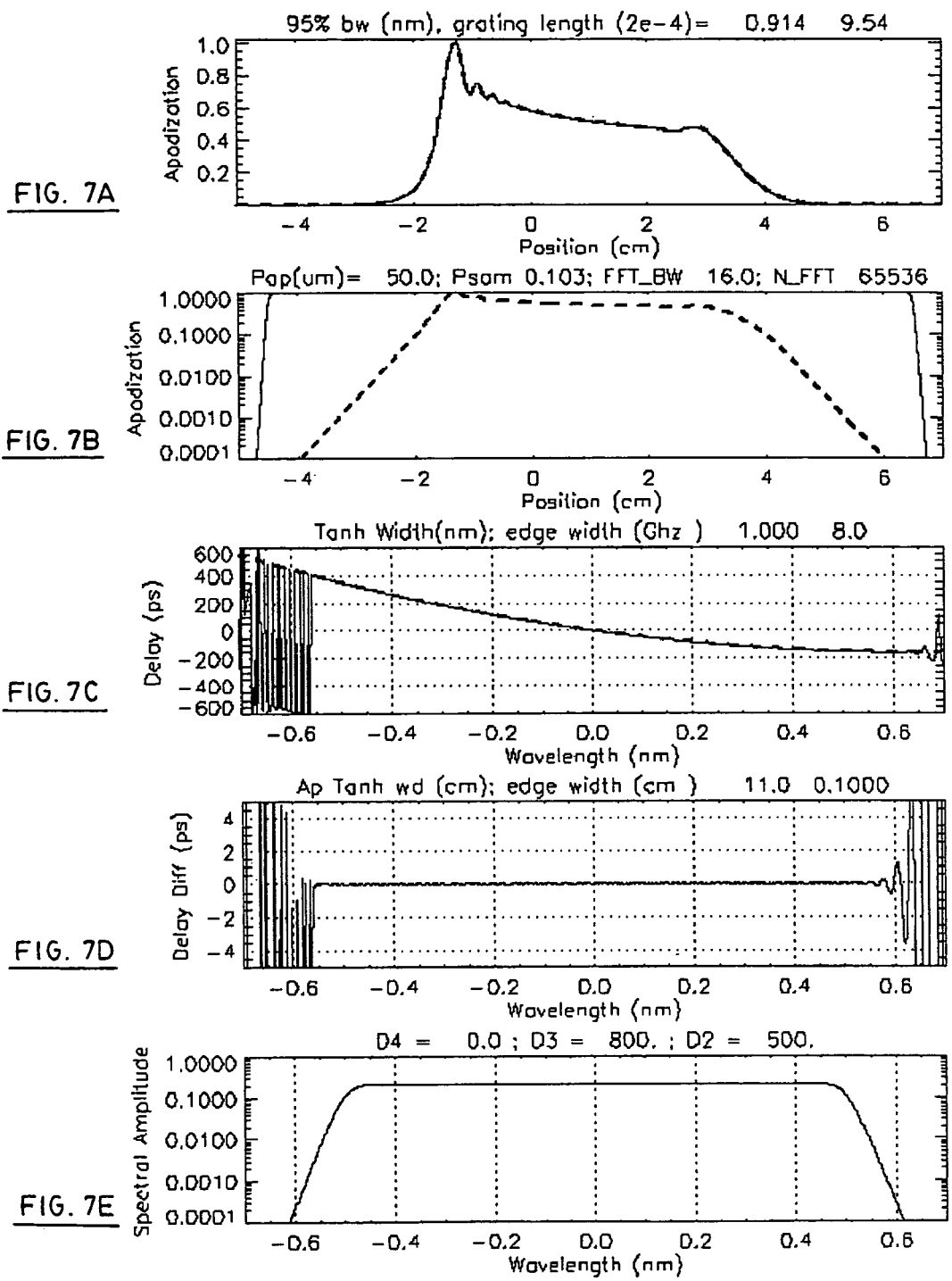

APODIZED FIBER BRAGG GRATING AND IMPROVED PHASE MASK, METHOD AND SYSTEM FOR MAKING THE SAME

FIELD OF THE INVENTION

The present invention relates to Fiber Bragg gratings (FBGs), and more particularly concerns a phase mask, a method and a system for facilitating the fabrication of apodized FBGs.

BACKGROUND OF THE INVENTION

A fiber Bragg grating is a refractive index modulation having a periodic profile, photoinduced in an optical fiber. Writing a FBG comprises two aspects: phase and amplitude. The phase gives the position of the FBG index fringes relative to the assumed underlying uniform pitch, and the amplitude is the magnitude of the index modulation at any given location in the FBG. Variation of the FBG amplitude is often called apodization, since the ends of the FBG must be softened (apodized, or gradually reduced to zero) in order to avoid undesirable group delay and reflectivity ripples, which would result from an abrupt transition from a non-zero amplitude to zero.

To mathematically describe the FBG, the modulation of the effective refractive index of a single mode fiber can be written as:

$$n(x)=n_{eff}(x)+\Delta n(x)\cos(k_{g0}x+\phi_g(x))=n_{eff}(x)+Re\{\Delta n(x)\exp[i(k_{g0}x+\phi_g(x))]\} \quad (1)$$

where the FBG central k-vector is $k_{g0}=2\pi/\Lambda_g$ and $\Lambda_g$ is the central period (or pitch) of the grating in the fiber. This index modulation causes a Bragg reflection band at a desired central wavelength $\lambda_B$, which is given by $\lambda_B=2n_{eff}\Lambda_g$, and where $n_{eff}$ is the effective average (i.e. excluding the rapidly varying index modulation) mode index of the single mode fiber. $n_{eff}$ can be slowly varying and thus it is written in Eq. (1) as $n_{eff}(x)$. $\Delta n(x)$ is the amplitude of the index modulation, and therefore represents the apodization profile. $\phi_g(x)$ is the residual phase, representing the fringe position relative to the uniform period $\Lambda_g$, $2\pi$ of phase corresponding to a fringe position shift equal to the full fringe period $\Lambda_g$. Finally, x is the position along the fiber. Note that the phase information $\phi_g(x)$ can be used to 'chirp' the grating, which can be used for dispersion compensation, and also the phase can be used for 'sampling', which produces multiple reflection bands that for example may be matched to the standard ITU grid frequencies used in commercial WDM systems. Phase sampling has been described in detail in U.S. patent application Ser. No. 09/757,386, entitled "EFFICIENT SAMPLED BRAGG GRATINGS FOR WDM APPLICATIONS", which is incorporated herein by reference.

Several methods have been developed for FBG writing using the side illumination of the optical fiber through a phase mask, as illustrated in FIG. 1A (PRIOR ART). Such a typical system includes a source of actinic radiation, for example UV laser 100, projecting light along the optical fiber 102 through a phase mask 104. A scanning mechanism 106 may be used for example to illuminate a long section of fiber 102 through the mask 104, typically with a beam of small diameter (a few mm or smaller). Alternatively, one can scan the mask/fiber pair and keep the writing beam fixed, or avoid scanning entirely and use a writing beam large enough to expose the entire section of fiber required. The mask has a periodic structure of grating corrugations 108 on the surface closest to the fiber 102, which, when illuminated by the writing laser, generates diffracted orders forming an intensity fringe pattern that photoinduces a refractive index modulation along the fiber 102, defining the FBG 110.

The height of the grating corrugations at the mask surface, with peaks and valleys of ±d, has a periodic distribution and can be written as $$h(x)=d\sin(k_{m0}x+\theta_m(x)) \quad (2)$$

where the mask has an underlying period $\Lambda_m$ and k-vector $k_{m0}=2\pi/\Lambda_m$, and the residual phase of the mask corrugation function is $\theta_m(x)$. Although we assume a sinusoid here for simplicity, typically the corrugation of the mask will be closer to a square wave, but the exact shape does not affect the general concept represented here. The grating corrugations in the mask cause the writing beam to diffract into multiple orders. The corrugation depth $2d$ is chosen such that the $\pm 1^{st}$ orders are maximized and the $0^{th}$ order is minimized. Typically this depth will be near the size of the UV wavelength (e.g. $2d$ is about 250 nm). For a uniform mask of period $\Lambda_m$, the two $1^{st}$ order beams will interfere to produce an intensity pattern with a fringe period (and thus the period of the grating in the fiber) $\Lambda_g=\Lambda_m/2$. It is also known in the art to use a mask which is patterned with a non-uniform period (chirp) or phase to produce a similarly varying chirp or phase in the FBG. Thus, the phase information is usually embodied into the periodic distribution of the grating corrugations. The amplitude, and therefore apodization, information, however, is usually introduced in the writing process itself. The simplest method is simply to vary the laser beam power during writing. However, this method causes a variation in $n_{eff}(x)$, which leads to severe distortion of the FBG reflection spectrum. To correct this a second pass of fiber exposure is used to equalize $n_{eff}(x)$ over the FBG length, but this is more complex and is subject to various uniformity and alignment issues.

A standard technique to achieve apodization without variation of laser power is by controlled wiggling of the mask during writing, such as for example shown in U.S. Pat. No. 6,072,926 (COLE et al). This is illustrated in FIG. 1A (PRIOR ART) where mask wiggler 112 is shown. If the mask is wiggled by a distance more than one fringe period, the fringes can wash out completely. By changing the wiggling amplitude one can control the net fringe amplitude and thus control the index modulation amplitude $\Delta_n(x)$. This method is still mechanically complex and is subject to the variations of the mechanical wiggling system. Moreover, as a result of nonlinear writing sensitivity, this method can still have the undesired effect of varying the effective average index $n_{eff}(x)$, distorting the FBG spectrum. In the absence of such a wiggling apparatus, the mask and the fiber can be mechanically joined by a very simple jig (perhaps just a spacer between the fiber and mask and. a clamp to hold them together). This type of mechanical arrangement is likely to have the best thermal and mechanical stability, which can greatly improve the quality of the written FBGs.

Ideally, the apodization information should be included in the mask itself, so that the writing process would simply consist of scanning the mask-fiber with the writing laser beam, without additional mechanical variations, or a simple exposure by a stationary large beam.

A few methods have been proposed in the prior art to incorporate the amplitude information into the mask. One approach uses modulation of the duty cycle (i.e. width), or etch depth, of the grating corrugation on the mask to modulate the intensity of the $\pm 1^{st}$ and $0^{th}$ order diffracted beams, such that the visibility of the fringes in the transmitted light is varied. This approach suffers from a number of practical difficulties in achieving the desired flexibility and accuracy of the amplitude profile, and since the visibility of the fringes is modulated, it is possible that it could generate some undesirable variation of the effective average index of the fiber core, $n_{eff}(x)$. A summary of these prior art methods can be found in the book by R. Kashyap, "Fiber Bragg Gratings", Academic Press, 1999 (chapter 5).

Also known in the art is to use interference between two FBG fringe patterns to control fringe amplitude, as disclosed in U.S. Pat. No. 6,307,679 (KASHYAP). However, the two component FBG patterns are written sequentially. As a result, this method has the drawback that the longitudinal position of the fiber must remain very precisely controlled, generally on the scale of 1 nm, between the sequential writing passes of the two FBG patterns. In addition, the writing laser power and beam position and angle must be very precisely maintained between the two writing passes. A number of approaches were also recently proposed in U.S. patent application Ser. No. 10/154,505 by Popelek et al, filed on May 24, 2002 and entitled "Embodying Amplitude Information into Phase Masks", which use a single illumination of the combination of multiple patterns on the same mask to achieve the required apodization.

In view of all of the above, there is a need for an improved phase mask and a FBG writing method overcoming the drawbacks of the prior art methods discussed herein.

SUMMARY OF THE INVENTION

The present invention therefore provides a Bragg grating photoinduced into a photosensitive medium, the Bragg grating having a light reflection spectrum including a spectral region of interest. The Bragg grating includes a refractive index profile defining grating fringes along the photosensitive medium. The refractive index profile has a periodic apodization phase component, which is designed to apodize the grating fringes reflecting light within the spectral region of interest by generating spurious reflection features outside of the spectral region of interest.

In accordance with another aspect of the present invention there is also provided a phase mask for photoinducing a Bragg grating into a photosensitive medium, the Bragg grating having grating fringes defining a light reflection spectrum including a spectral region of interest.

The phase mask has a plurality of grating corrugations positioned along the mask according to a periodic distribution. This periodic distribution has a periodic apodization phase component. The apodization phase component is designed to apodize the grating fringes reflecting light within the spectral region of interest by generating spurious reflection features in the reflection spectrum outside of the spectral region of interest.

In accordance with still another aspect of the present invention a method for photoinducing a Bragg grating into a photosensitive medium is provided, the Bragg grating having grating fringes defining a light reflection spectrum including a spectral region of interest. The method includes the steps of:

a) providing a phase mask having a plurality of grating corrugations positioned therealong according to a periodic distribution, the periodic distribution having a periodic apodization phase component. The apodization phase component is designed to apodize the grating fringes reflecting light within the spectral region of interest by generating spurious reflection features in the reflection spectrum outside of the spectral region of interest;

b) disposing the photosensitive medium along the grating corrugations in close proximity to the phase mask; and c) projecting actinic radiation through the phase mask. The actinic radiation is diffracted by the grating corrugations to generate the Bragg grating, this Bragg grating being photoinduced into the photosensitive medium.

Finally, there is also provided a system for photoinducing a Bragg grating into a photosensitive medium, this Bragg grating having grating fringes defining a light reflection spectrum including a spectral region of interest.

The system includes a phase mask having a plurality of grating corrugations positioned therealong according to a periodic distribution. The periodic distribution has a periodic apodization phase component. This apodization phase component is designed to apodize the grating fringes reflecting light within the spectral region of interest by generating spurious reflection features in the reflection spectrum outside of the spectral region of interest, the photosensitive medium being disposed along the grating corrugations in close proximity to the phase mask. The system also includes light projection means for projecting actinic radiation through the phase mask. The actinic radiation is diffracted by the grating corrugations to generate the Bragg grating, the Bragg grating being photoinduced into the. photosensitive medium.

Stated simply, the present invention enables the use of extremely precise phase-only variations, i.e. the positions of the individual grooves in a phase mask design, to achieve apodization that would otherwise require modulation of the fringe depth in an FBG. This approach has significant advantages over the prior art. First, it allows for fabrication of complex FBGs with a very simple exposure without, for example, the need to use a very small scanned writing beam, or the use of complex mechanical systems such as needed for piezo-driven dithering. The exposure could for example be just a blanket illumination with a stationary large beam. Second, this apodization approach has reduced, if not zero, side effects on varying the average index of the FBG—a problem that can occur with other methods. Finally, this approach has high resolution and mathematical precision, leveraging the precision of semiconductor lithography tools. This enables the manufacture of high resolution and complex FBGs using a precise mask and an extremely simple exposure procedure.

Other advantages of the present invention will be better understood upon reading preferred embodiments thereof with reference to the appended drawings.

BRIEF DESCRIPTION OF THE DRAWINGS

FIGS. 5, and 5A to 5C show experimental results of reflection spectra for an apodized linearly chirped single channel FBG, the apodization period being about 24 µm.

FIGS. 6A to 6C show experimental results for the response, dispersion and group delay ripple for the central channel of the same FBG as in FIG. 5.

FIGS. 7A to 7E are graphic representations of the apodization, delay, delay difference and spectral amplitude for a nonlinearly chirped FBG, with an apodization period of 50 µm.

DESCRIPTION OF PREFERRED EMBODIMENTS OF THE INVENTION

The present invention provides an improvement in the fabrication of fiber Bragg gratings. It relies on the fact that in practice, FBGs are used to modify light beams having a wavelength or wavelengths within a spectral region of interest, the simplest example being the telecommunication C-band. Outside of this region, the reflection features of a FBG are irrelevant. This is advantageously utilized herein to improve their characteristics within the spectral region of interest.

It will be understood that although the description below refers to Fiber Bragg gratings, the present invention could easily be applied to a grating in any appropriate type of photosensitive medium where a refractive index grating is used.

In accordance with the principles of the present invention, there is provided a phase mask for the fabrication of an improved FBG, and the resulting grating photoinduced in an optical fiber. The phase mask includes a plurality of corrugations, positioned so as to have a periodic distribution. This distribution is designed to incorporate in its pattern the amplitude information of the desired FBG. The target amplitude of the grating is here varied by including an apodization component into the location, i.e. the phase, of the corrugations on the mask. This additional phase component is periodic and has an amplitude that varies slowly along the grating. It reduces the local reflectivity along the grating within the spectral region of interest in such a way that the global reflectivity of the grating taken as a whole is as desired within said spectral region of interest. The period of this additional phase component is selected so that spurious reflection features are created outside of the spectral region of interest. In other words, the additional phase component shapes the reflectivity within the spectral region of interest by creating sidebands outside of said spectral region of interest. As opposed to the prior art methods that vary the diffraction efficiency into the $0^{th}$ and $1^{st}$ orders, this method redistributes angularly the UV light within the $1^{st}$ order in such a way as to vary the amplitude of the grating fringes with periods creating reflectivity within the region of interest, while introducing additional fringes with periods that create reflectivity outside of the spectral region of interest. In this way, one can effectively achieve apodization of the grating fringes relevant to the spectral region of interest, while the actual total fringe amplitude $\Delta n(x)$ is completely constant. Therefore, one substantially eliminates any potential variation in the average index $n_{eff}(x)$, which can result from nonlinear writing sensitivity.

Figure 1A:
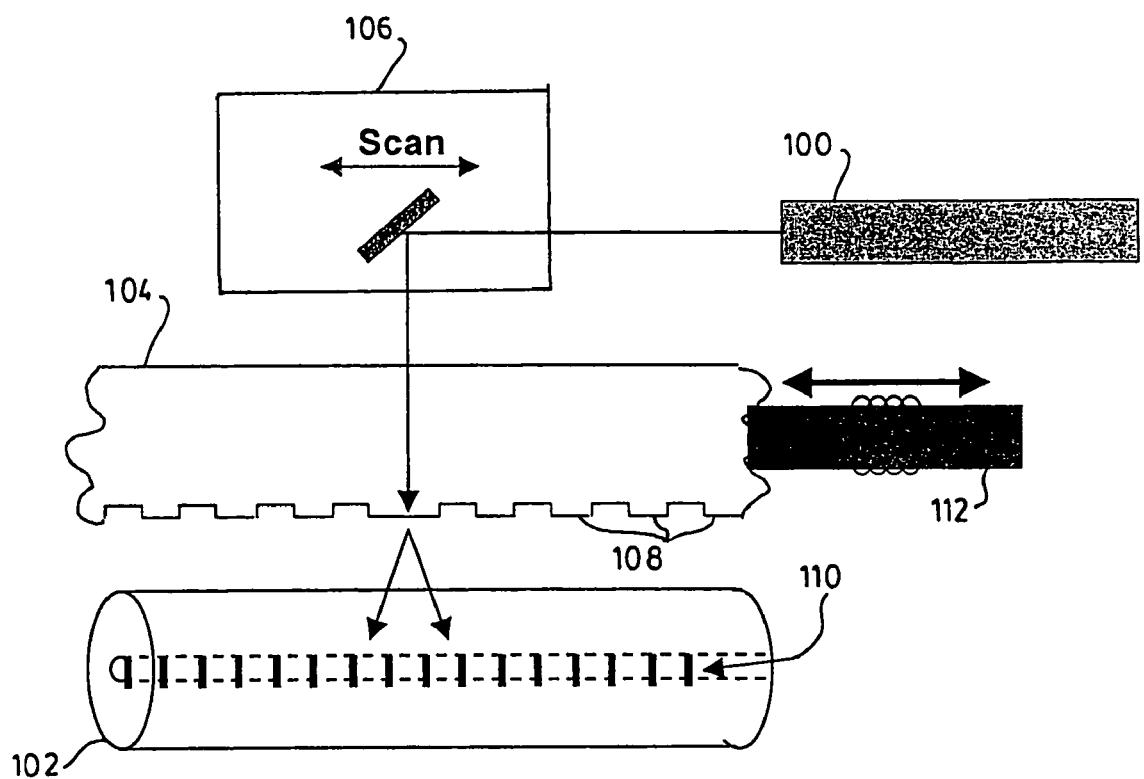
FIG. 1A (PRIOR ART) is a schematic representation of a system according to prior art illustrating the standard method for writing an FBG by side illumination through a phase mask.
Figure 1B:
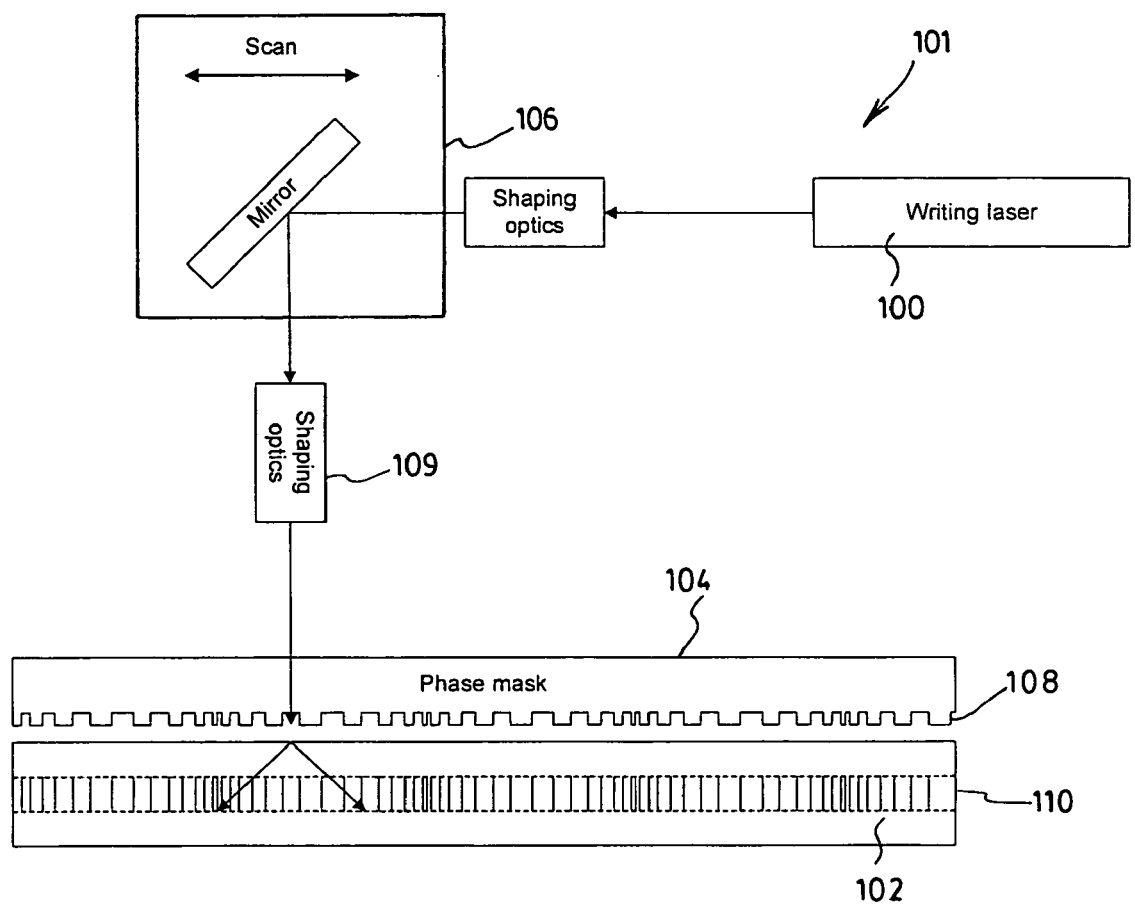
FIGS. 1B and 1C are schematic representations of systems according to preferred embodiments of the present invention.
Figure 1C:
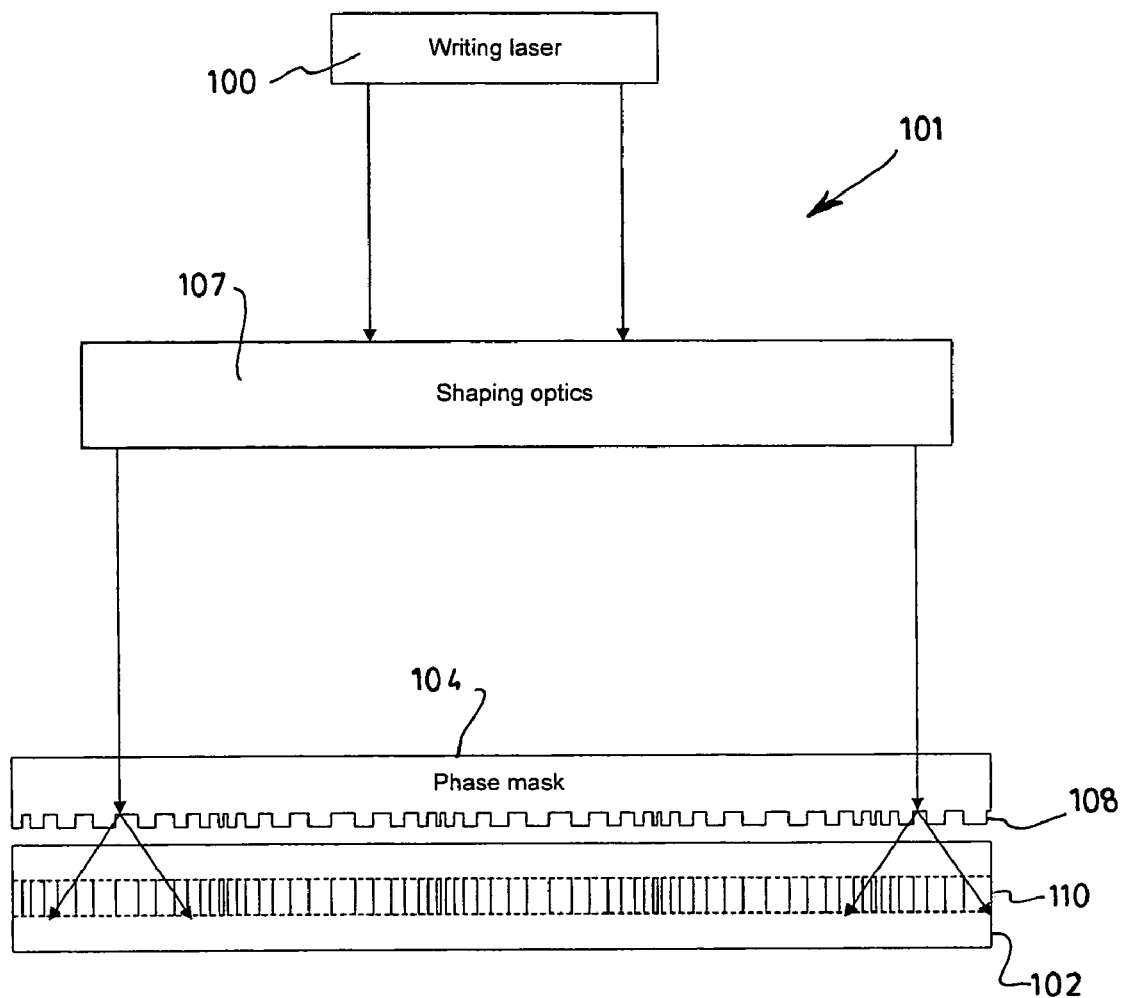

Referring to FIGS. 1B and 1C, there are shown two preferred embodiments of a system 101 to fabricate an FBG, according to another aspect of the present invention. The system includes a phase mask 104 having a plurality of grating corrugations 108 positioned therealong according to a periodic distribution. As explained above, the periodic distribution has an apodization phase component, which is designed to apodize the grating fringes reflecting light within a spectral region of interest by generating spurious reflection features in the reflection spectrum outside of the spectral region of interest. Of course, one skilled in the art will understand that the scale of the grating corrugations with respect to the phase mask, as well as the rate of change of the grating corrugations, have been exaggerated here for illustration purposes only. The optical fiber 102 is disposed along the grating corrugations 108 in close proximity to the phase mask 104. The system 101 also includes a light source 100 for generating actinic radiation, such as but not limited to a UV laser. The light is projected through the phase mask 104. In the embodiment of FIG. 1B, a scanning mechanism 106 is provided to scan the light beam along the length of the mask. In the embodiment of FIG. 1C, shaping optics 107 are provided to enlarge the beam and simultaneously write all of the grating. Of course, additional shaping optics 109 may be added at any point of the light beam's path such as shown in FIG. 1B to modify the light beam as needed, such as for controlling the curvature of the writing beam or focussing the same on the fiber in the direction perpendicular thereto. The actinic radiation is diffracted by the grating corrugations 108 to generate the Bragg grating 110 by interference of the ±1$^{rst}$ orders, as explained above. The Bragg grating 110 is therefore photoinduced into the optical fiber 102. It should be noted that with a system according to the present embodiment, there is no need for a mask wiggler as shown in FIG. 1A (PRIOR ART), as the amplitude information is directly included in the periodic distribution of the phase mask corrugations.

A practical embodiment of designing the Bragg grating according to a preferred embodiment of the present invention is set out below. It is understood however that the present invention is not limited to the mathematical representation developed here.

Exemplary Design of a Bragg Grating According to a Preferred Embodiment of the Invention Referring to Eq. (1), the essential idea here is to replace the amplitude function $\Delta n(x)$ by a phase only function. Thus we define a 'phase apodization' function:

$$A(x) = \Delta n_0 \exp[i\phi_{AP}(x)] \qquad (3)$$

One sees that the function $A(x)$ has a completely uniform amplitude $\Delta n_0$, and thus is entirely defined by the apodization phase function $\phi_{AP}(x)$. The goal will be to design $A(x)$ such that it can replace $\Delta n(x)$ in Eq. (1), and the resulting FBG spectrum will achieve the desired performance required for the device in the spectral region of interest. Thus the index modulation, or refractive index profile is written as $$n(x) = n_{\it eff} + Re\{A(x)\exp[i(k_{g0}x + \phi_g(x))]\} = n_{\it eff} + \Delta n_0 Re\{\exp[i(k_{g0}x + \phi_g(x) + \phi_{AP}(x))]\} \qquad (4)$$

From equation (4) one sees that the index modulation is now a constant $\Delta n_0$ and has no amplitude variation whatsoever. The FBG could then be written with an appropriate phase mask that incorporates both the usual designed grating phase $\phi_g(x)$ (e.g. chirp etc) and the proposed apodization phase $\phi_{AP}(x)$, and thereby no modulation of the actual fringe amplitude would be required, either through wiggling of the phase mask or by other methods.

In accordance with a preferred embodiment of the present invention, $\phi_{AP}(x)$ is set equal to a rapidly varying sinusoid whose amplitude is slowly varying, in comparison to the period of the sinusoid, as a function of x. The sinusoid is selected here as it is a particularly simple embodiment to analyze, but it is understood that the present invention could also be applied using any other relevant periodic function. The sinusoidal phase variation causes the FBG fringes that reflect within the spectral range of interest to disappear, partially or completely, while generating spurious fringes that reflect at a period well out of the spectral range of interest. Put another way, a periodic phase variation will cause generation of harmonic sideband channels in the reflection spectrum. These spurious 'apodization' sideband channels are generated at the expense of reducing the reflection response in the central channel of interest. That is, the sinusoidal phase modulation effectively reduces the reflectivity in the central channel, or equivalently reduces the effective amplitude of the grating responsible for the reflectivity of the central channel.

Thus, one defines the apodization phase as $$\phi_{AP}(x) = \phi_0(x)\sin(2\pi x / P_A) \qquad (5)$$

where the amplitude of the sinusoid $\phi_0(x)$ varies slowly in comparison to the sinusoid period $P_A$. To understand how this method works, first consider this phase apodization as used with a uniform grating of wavenumber $k_{g0}$. That is, let the FBG modulation be given by $$n(x) = n_{\it eff} + \Delta n_0 Re\{\exp[i(k_{g0}x + \phi_{AP}(x))]\} \qquad (6)$$

Now one makes use of the identity $$\exp[i\phi_0 \sin(\theta)] = \sum_{m=-\infty}^{\infty} J_m(\phi_0)\exp[im\theta] \qquad (17)$$

where $J_m$ is an ordinary Bessel function. One takes $\theta = 2\pi x/P_A$ to obtain $$n(x) = n_{\it eff} + \sum_{m=-\infty}^{\infty} \Delta n_0 J_m(\phi_0(x)) Re\{\exp[i(k_{g0}x + m2\pi x/P_A)]\} \qquad (8)$$

The index modulation can then be viewed as resulting from a superposition of gratings, each with an index modulation profile $\Delta n_0 J_m(\phi_0(x))$ and a k-vector $k_{g0} + 2m\pi/P_A$. The central wavelength $v_m$ of the grating with subscript m in the series thus verifies the following equation, i.e.

$$n_{\it eff}(v_m)v_m = \frac{c}{4\pi}\left(k_{g0} + \frac{2m\pi}{P_A}\right). \qquad (9)$$

The frequency separation between the individual reflectivity spectra can be calculated as follows. According to equation (9), $$n_{\it eff}(v_{m+1})v_{m+1} - n_{\it eff}(v_m)v_m = \frac{c}{2P_A}. \qquad (10)$$

On the other hand, the effective group index $n_g$ is defined as (G. P. Agrawal, Nonlinear fiber optics $2^{nd}$ Ed., Academic Press, 1995)

$$n_g = n_{\it eff} + v\frac{dn_{\it eff}}{dv}. \qquad (11)$$

The effective group index thus verifies the following equation, i.e.

$$n_g dv = d(vn_{\it eff}). \qquad (12)$$

Equation (10) can thus be rewritten as $$n_g \Delta v = \frac{c}{2P_A}, \qquad (13)$$

where $\Delta v$ represents the frequency spacing between neighbouring reflectivity spectra of individual gratings. For example, if $P_A = 100$ μm, the frequency spacing between the individual reflectivity spectra $\Delta v$ is about 1000 GHz corresponding to 8 nm in wavelength shift at 1550 nm.

The reflectivity spectrum of the phase-apodized grating described by equation (6) is given by the combination of the reflectivity spectra of the individual gratings in the series in equation (8) as long as these reflectivity spectra do not overlap spectrally. In other words, the reflectivity spectrum of the phase-apodized grating will be given by the combination of the reflectivity spectra of the individual gratings appearing in the series in equation (8) as long as these gratings do not interfere with one another. To this end, the frequency spacing Δv calculated above must be large enough. Also, the individual spectra must be narrow enough. This second condition puts a limit on the speed at which the amplitude $\phi_0(x)$ of the apodisation phase component can vary along the grating. As aforementioned, the amplitude of the index modulation associated to an individual grating is given by $\Delta n_0 J_m(\phi_0(x))$. A rapidly varying amplitude $\phi_0(x)$ will produce a broadening of the reflectivity spectra of the individual gratings that could lead to interference between the gratings.

This representation of the phase-apodized grating as a superposition of gratings is a mathematical view that helps understanding the behaviour of these phase-apodized grating. It will however be understood that this should not be interpreted to mean that the phase-apodized grating is fabricated by superposing gratings. As a matter of fact, the preferred embodiments described herein do not use such a fabrication technique, but photoinduce the grating through a scan of a small beam or exposure with a large beam of a phase mask which includes the elements of the invention in its design. Moreover, it should be realized that the series in equation (8) contains an infinite number of terms: the phase-apodized grating cannot in principle be fabricated by writing superposed gratings. Even if the number of individual gratings was finite, it would be exceedingly difficult to fabricate the phase-apodized grating by superposing individual gratings, since this superposition should be performed with a well defined phase relationship between the gratings.

Figure 2A:
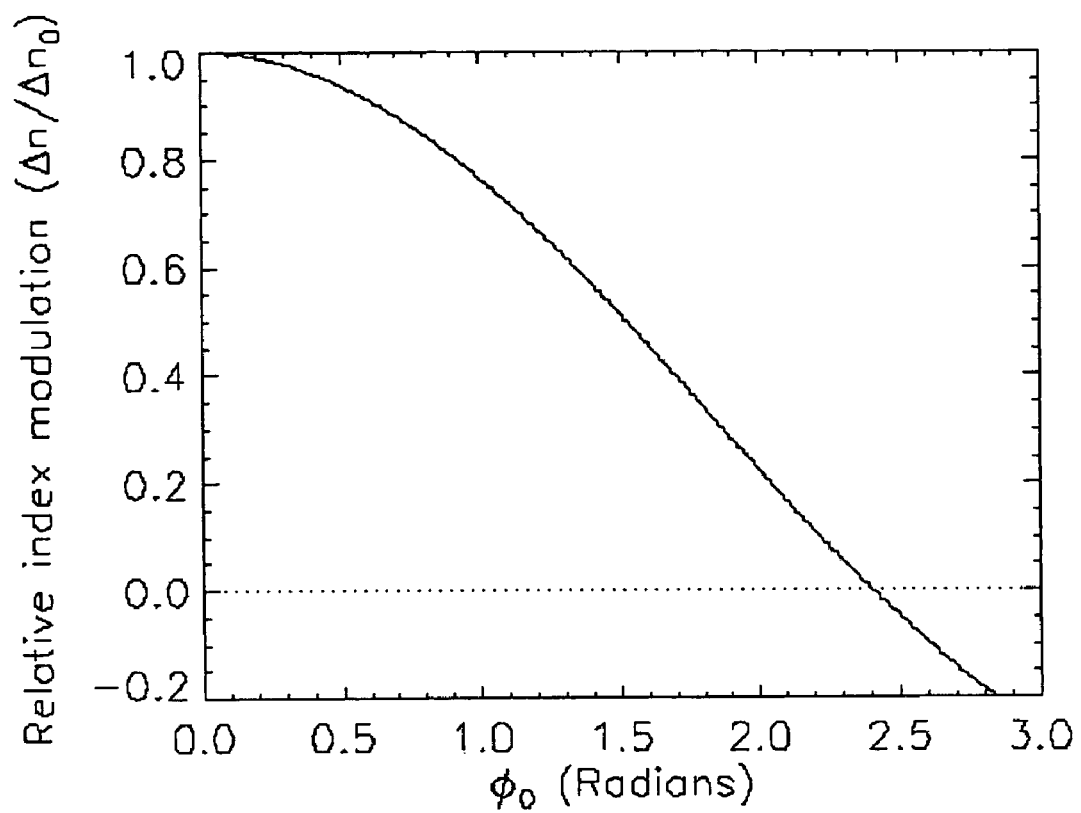
FIG. 2A is a graph illustrating the effective relative modulation amplitude of FBG fringes resulting from sinusoidal phase only apodization, versus the amplitude of the phase sinusoid according to a preferred embodiment of the present invention.

The mathematical representation of the phase-apodized grating as a superposition of individual gratings with different central frequencies is especially useful when the individual gratings do not interfere with one another. Under this condition, only the central grating (m=0) provides reflectivity in a spectral region of interest, and the spurious apodization gratings (m≠0) can therefore be ignored. This leaves a central channel as would be reflected by a uniform grating, with an equivalent amplitude as a function of the position x along the fiber given by $$\Delta n(x) = \Delta n_0 J_0(\phi_0(x)) \quad (14)$$

$$\text{or } \phi_0(x) = J_0^{-1}(\Delta n(x)/\Delta n_0) \quad (15)$$

where $\Delta n_0$ is the maximum grating amplitude when the phase apodization $\phi_0$ is zero. Thus, the effective reduction in $\Delta n/\Delta n_0$ is given by the $0^{th}$ order Bessel function $J_0$, which is plotted in FIG. 2A. One sees that the reduction of Δn varies smoothly with $\phi_0$ until Δn reaches zero at the first zero of $J_0$, for $\phi_0$=2.4048. Thus one can fully control the apodization by designing $\phi_0(x)$ to precisely vary between 0 and 2.4048.

To summarize the above reasoning more concisely, if one desires to write the grating with index modulation $$n(x) = n_{eff} + Re\{\Delta n(x) \exp[i(k_{g0}x + \phi_g(x))]\} \quad (16)$$

one can instead write a grating with no amplitude variation along the length Δn(x), i.e. a grating with constant fringe amplitude $\Delta n_0$ and "phase-only" apodization as in Eq. (4)

$$n(x) = n_{eff} + \Delta n_0 Re\{\exp[i(k_{g0}x + \phi_g(x) + \phi_0(x)\sin(2\pi x/P_A))]\} \quad (17)$$

where $\phi_0(x)$ is given by Eq. (15). $P_A$ is required to be sufficiently small such that the spurious sidebands at $\Delta v_m = mc/2n_g P_A$ are of no concern, and that the scale of the variation in $\phi_0(x)$ is long compared with $P_A$.

Phase Mask Design According to a Preferred Embodiment

To obtain a grating having the refractive index profile defined above, the phase mask used for its fabrication must have an appropriately designed grating corrugation distribution.

Fabrication of FBGs with complex and high frequency phase patterns using a mask is discussed at length in U.S. Pat. No. 6,654,521 (SHENG et al). A standard arrangement used for FBG side writing, with the fiber proximal to the mask may be utilized. One may scan a writing beam as shown in FIG. 1B, or a large stationary beam may be used to expose the entire required section of the FBG, as shown in FIG. 1C. As disclosed by SHENG, it is preferable to account for the diffraction from the mask to the core of the fiber to properly design the mask to achieve the desired phase variation in the FBG. These diffraction effects are more easily compensated if one minimizes the distance between the mask and the fiber. Herein below, the essential results are summarized, and the application to the phase-only apodization method is described. It should be understood that this approach is a simple approximation used to illustrate an exemplary embodiment of the present invention, and that a more sophisticated diffraction analysis (e.g. propagation of plane wave spectra, or vector diffraction) may be needed for some mask-fiber spacings and grating designs.

It is desired to write an FBG with phase for apodization given by Eq. (5) and repeated here $$\phi_{AP}(x) = \phi_0(x)\sin(2\pi x f_A) \quad (18)$$

where $f_A = 1/P_A$ is the spatial frequency of the apodization sinusoid. Because the $\pm 1^{st}$ order diffracted beams, which interfere to form the FBG, meet the fiber core at a distance Δz away from the mask, and are incident at an angle $\theta_0$ away from normal incidence, they come from slightly displaced positions $x = \pm\Delta x/2$ at the mask, where Δx is defined by the diffraction angle $\theta_0$ and the mask-fiber spacing (see FIG. 1 and Eq. (14) of U.S. Pat. No. 6,654,521. If one describes the phase of the mask corrugation by $\theta_m(x)$, then it was shown in U.S. Pat. No. 6,654,521 that the phase of the grating in the core of the fiber is given by $$\phi_{FBG}(x) = \theta_m(x - \Delta x/2) + \theta_m(x + \Delta x/2) \quad (19)$$

Taking the Fourier transform, one obtains the phase frequency transfer function for the mask-to-fiber writing process:

$$\tilde{\phi}_{FBG}(f) = 2\cos(\pi f \Delta x)\tilde{\theta}_m(f) \quad (20)$$

where $\tilde{\phi}_{FBG}$ and $\tilde{\theta}_m$ are Fourier transforms and f is the spatial frequency of the mask or FBG phase. Thus, in the case of apodization with a sinusoidal phase as defined in Eq. (18), one designs the mask to have an apodization phase (in addition to any other phase components designed for chirp or sampling) with a sinusoidal component defined by $$\theta_{AP}(x) = \theta_{AP0}(x)\sin(2\pi x f_A) \quad (21)$$

where the appropriate mask phase amplitude $\theta_{AP0}(x)$ is designed to account for diffraction, and can be found using Eqs. (18) and (20):

$$\theta_{AP0}(x) = \phi_0(x)/2 \cos(\pi f_A \Delta x) \quad (22)$$

To achieve robust manufacturing with this technique, it is desirable to have a maximum tolerance to changes in the fiber-mask distance. Variations in this distance cause a change in Δx and thus would alter the effective amplitude of the sinusoidal phase in the grating. Differentiation of the relationship (22) gives the incremental change in the phase amplitude for an incremental change δ(Δx) in the value of Δx $$\delta\phi_0(x) = -2\pi f_A \theta_{AP0}(x) \sin(\pi f_A \Delta x) \delta(\Delta x) \quad (23)$$

Figure 2B:
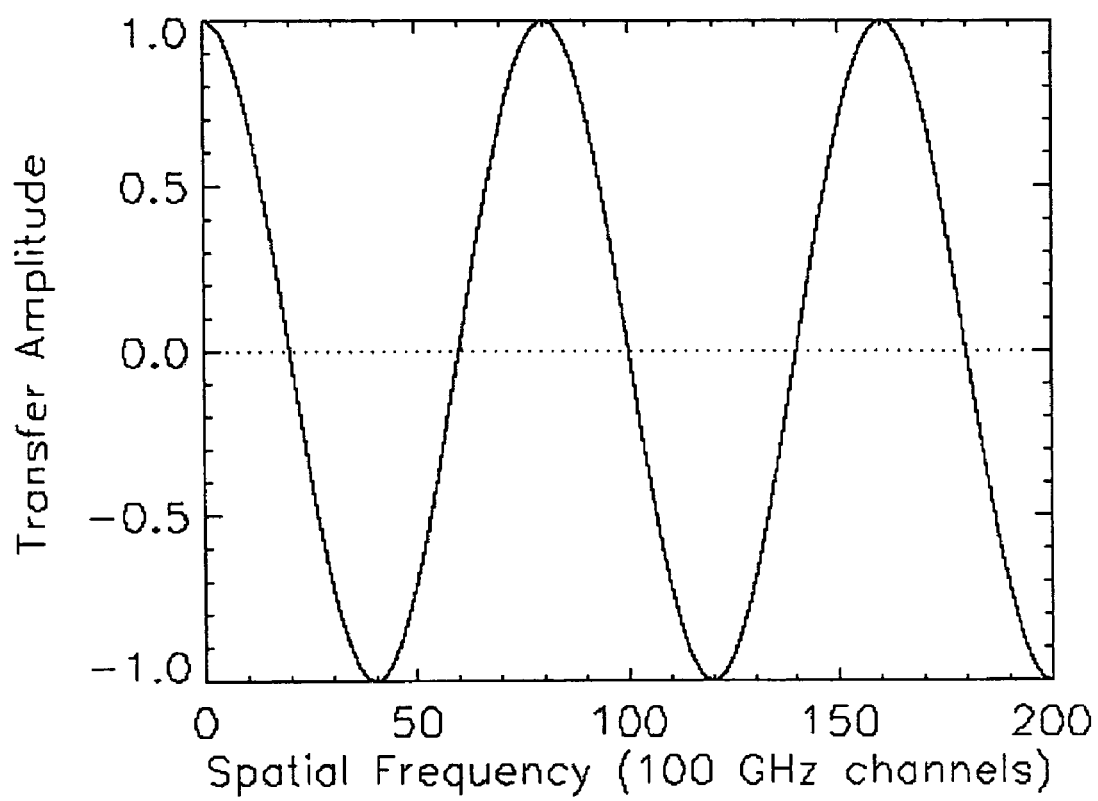
FIG. 2B is a graph illustrating the transfer amplitude of sinusoidal phase vs spatial frequency according to a preferred embodiment of the present invention.

Thus, to achieve the greatest tolerance to changes in Δx one sees that it is desirable to minimize $f_A$, however this may not be possible since for some designs $f_A$ must be sufficiently large to resolve rapid changes in apodization and to avoid interference from multiple channels. For large $f_A$, one can still achieve good tolerance by choosing $f_A$ such that the sinusoid in Eq. (23) is zero, i.e. when $f_A \Delta x = q$, q an integer. As an example, if the mask-fiber distance is of about 10 μm, then one finds that Δx is of about 25 μm, and the sin factor will be zero for $f_A = 1/25, 2/25$, or $3/25$ μm$^{-1}$, etc, or equivalently $P_A = 25, 12.5$, or 8.3 μm, etc (since $P_A = \Delta x/m$). In FIG. 2B the transfer amplitude, that is eq. (20) normalized to unity, is plotted for the case where Δx=25 μm, and the spatial frequency has been scaled in terms of the frequency shift of the apodization channels in units of 100 GHz intervals (i.e. $(cf_A/2n_g)/100$ GHz). Thus, for example an apodization period of 25 μm would correspond to a shift of about forty 100 GHz channels. From FIG. 2B one sees that the transfer amplitude has extrema at about 40, 80, 120, 160 channels. At these extrema one has zero derivative, as per Eq. (23) and thus maximum tolerance to changes in the mask to fiber distance. However, from inspection of Eqs. (22) and (23), one can see that the higher order extrema at larger $f_A$ still have increased sensitivity to changes in Δx. It would therefore be preferable to operate at the first extremum (40 channels in this example), however taking into consideration that $f_A$ must still be large enough such that undesirable interference effects do not limit the FBG performance. As shown below, for 40+ channel designs, the required value of $cf_A/2n_g$ may be as large as about 16 THz (160 channels). In this case one must ensure greater mechanical stability such that the changes in Δx are minimized.

Exemplary Experimental Results of Bragg Gratings According to Preferred Embodiments The use of the principles represented by Eqs. (17) and (15) has been tested on sample FBG designs. In all of the designs considered here, the conventionally required FBG apodization Δn(x) is obtained by Fourier synthesis. This approach assumes that the reflectivity spectrum of a FBG is given by the Fourier transform of the refractive index modulation profile of said FBG. This approach is valid as long as the reflectivity of the FBG is small. This is done for simplicity and numerical convenience only. For more complex designs, such as those with high reflectivity spectra, a more sophisticated design method, such as inverse scattering techniques (see e.g. "Feced et al, J. Quantum Electron. Vol. 35, p 1105–1115, 1999), could be used to determine Δn(x). Then, one could apply Eq. (15) using Δn(x) found by such a design method to obtain $\phi_0(x)$ and generate a phase-only apodized grating as described by Eq. (17). Indeed, any method may be used to design a desired apodization profile Δn(x) and then Eq. (15) may be used to define a phase-only apodized grating using Eq. (17).

Figure 3A:
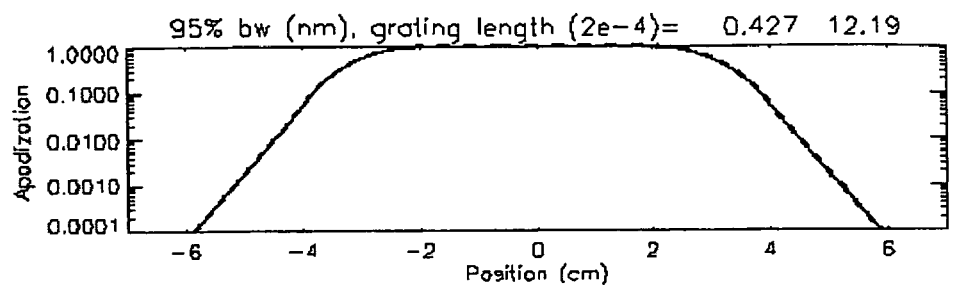
FIGS. 3A and 3B are graphic representations of the apodization vs position for the phase-only apodization of a single channel linearly chirped grating having an apodization period of 200 µm, according to another preferred embodiment of the present invention.
Figure 3B:
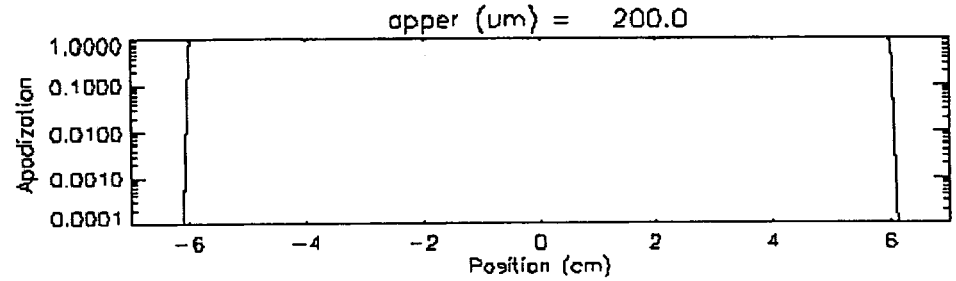

FIGS. 3A, 3B and 4A to 4F show the result of phase-only apodization for a simple linearly chirped single channel FBG with 1000 ps/nm dispersion. The period of the apodization sinusoid is chosen to be 200 μm, so that the spurious apodization channels are separated by about 4 nm (500 GHz) from the desired dispersion compensation channel. FIG. 3A shows the desired and effectively achieved apodization profile by varying of $\phi_0(x)$, as determined by Eqs. (14) and (15). FIG. 3B shows the actual amplitude variation assumed for Δn(x). It can be seen from FIG. 3B that Δn(x) is taken to be constant over the entire active region of the grating, which is arbitrarily taken to be the length over which the effective amplitude Δn(x) is greater than $2 \times 10^{-4}$ of the peak, but it is reduced to zero at the ends of the region to eliminate spurious reflection that could result from the abrupt change at the end. If suppression of the end reflection is needed, then the transition at the grating ends can be essentially of any form so long as the transition is not too rapid. In the case of FIG. 3B, there are no adverse effects for end transition regions wider than about a few 100 μm. As a result, a number of prior-art techniques could be used to incorporate the end transitions into the mask, since they are not critical. One method is just a gradual reduction of the width or depth of the mask grooves over the transition region. In general, one would expect that for larger spectral separation of the spurious apodization channels, the termination of the grating ends should be less critical. The 'end' apodization is included in the simulations here for numerical convenience only, and is not a required aspect of the invention. However, it is possible that it may be beneficial in some grating designs. As will be noted below, the experimental results indicate that such grating end apodization is not necessary to achieve excellent results, at least for the dispersive grating design used in this measurement.

Figure 4A:
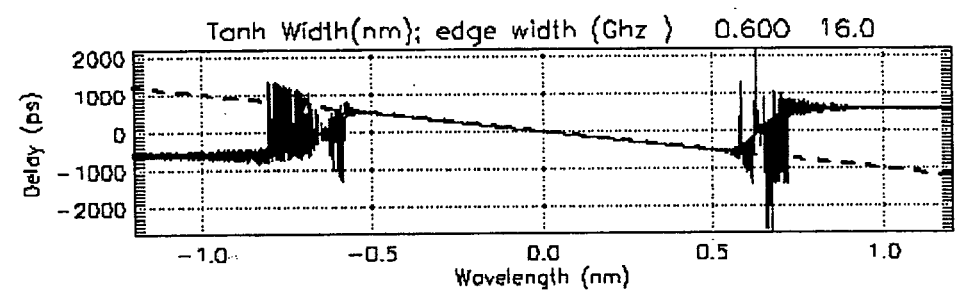
FIGS. 4A to 4F are graphic representations on two different wavelength scales of the delay, delay difference and spectral amplitude of linearly chirped FBG of FIGS. 3A and 3B.
Figure 4B:
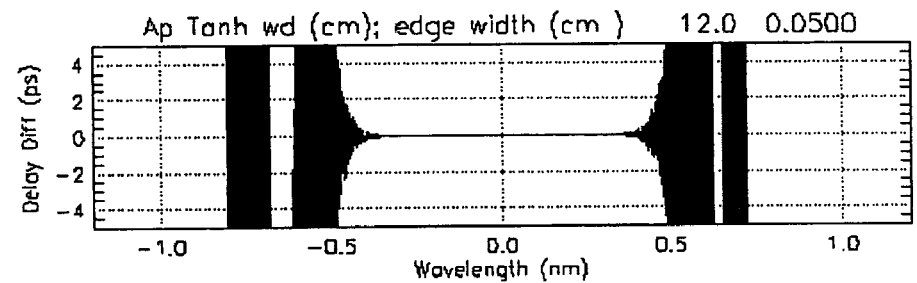
Figure 4C:
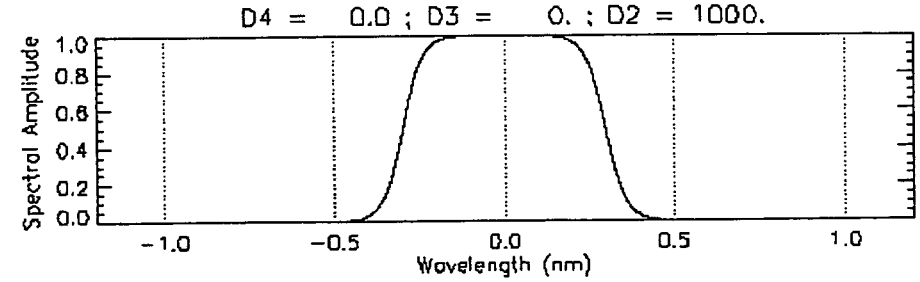

FIG. 4A shows the calculated group delay (solid) compared to the desired linear variation (dashed), and FIG. 4B shows the difference between the desired and calculated delays. FIG. 4C shows the calculated reflectivity amplitude of the phase-only apodized grating. It can be seen that over the ~0.4 nm bandpass of the reflective channel, there is no discernable difference between the desired and calculated group delay (i.e. zero group delay ripple), thus demonstrating the phase-only apodization method works as desired.

Figure 4D:
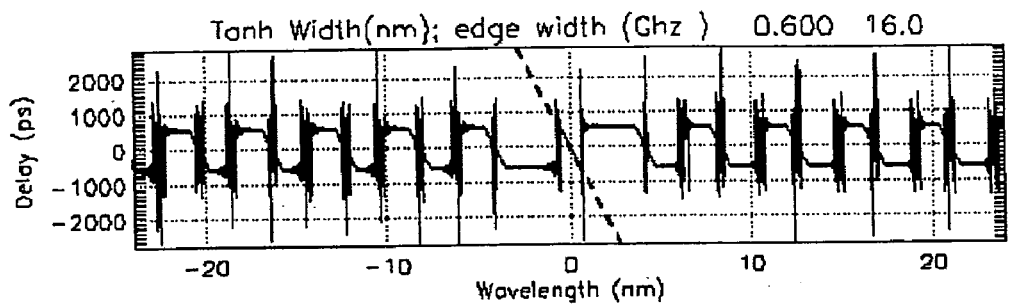
Figure 4E:
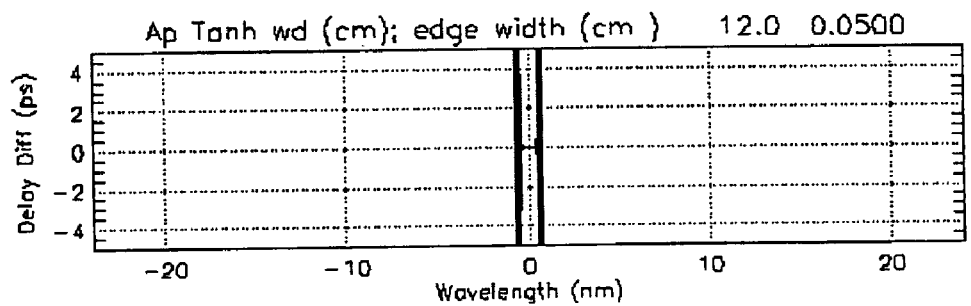
Figure 4F:
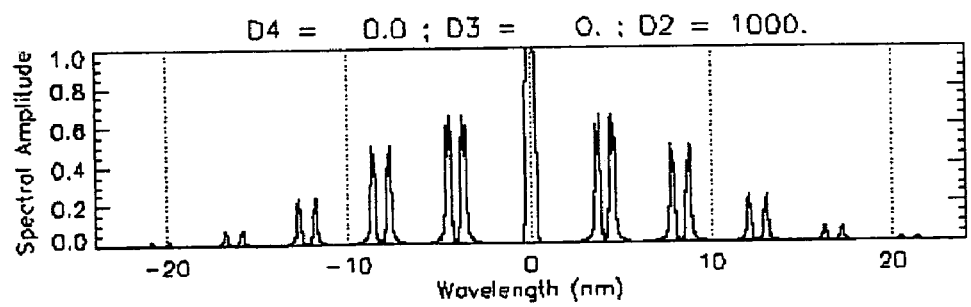

FIGS. 4D to 4F show the same calculation as for FIGS. 4A to 4C on a wide bandwidth scale, so that one can observe the spurious 'apodization channels'. It can be seen that these channels have separation of ~4 nm (500 GHz) as one would expect from the apodization period $P_A = 200$ μm. Note also, as seen in FIG. 4F, that each of the spurious channels is peaked near its spectral edges, and the response in the center of each spurious channel is near zero. This is simply a result of the redistribution caused by the phase-only apodization method. The apodization does not reduce the reflectivity at the center of the desired channel and so does not induce reflectivity at the center of the spurious channels. However, the apodization does reduce the reflectivity at the edges of the desired channel, by redistributing it at the edges of the spurious channels. Mathematically, this behavior stems from the fact that the amplitude of the gratings associated with the spurious channels is given by higher order Bessel functions, as seen in Eq. (8).

As mentioned earlier, with $P_A \leq 25$ μm, one would obtain a separation of more than 32 nm, exceeding the entire width of the telecommunications C-band. Such an experimental result, using a phase-only apodized, linearly-chirped FBG of dispersion of about −1500 ps/nm, is shown in FIG. 5. The apodization period $P_A$ is of about 24 μm. One sees that the frequency separation of the spurious channels is about 4.3 THz (or about 35 nm, an interval corresponding to some 43 channels separated by 100 GHz). The structure of the spurious channels, as seen in the enlargements of peaks FIGS. 5A to 5C, is exactly as predicted in FIG. 4F, with a minimum at the spurious channel center and the reflectivity peaked near the spurious channel edges. The desired central channel shows a smooth reflectivity with no significant side lobes and the noise floor outside the channel is more than 30 dB down from the peak. FIGS. 6A, 6B abd 6C show the measured response, dispersion and group delay ripple of the central channel. One observes very small group delay ripple, less than 8 ps peak-to-peak. This is another indication that the apodization method is achieving excellent results. It should be emphasized that this experimental result was obtained without any additional apodization (by means other than the designed phase-only method) of the grating ends whatsoever. This demonstrates that phase-only apodization alone may be used to fabricate dispersion compensating FBGs with excellent spectral characteristics.

Figure 8A:
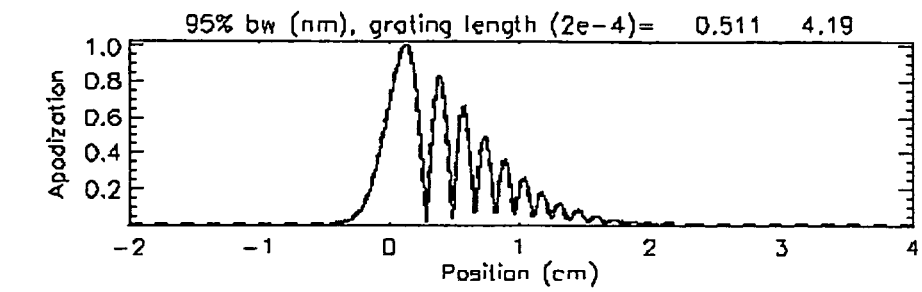
FIGS. 8A to 8E are graphic representations of the apodization, delay, delay difference and spectral amplitude for a nonlinearly chirped FBG, with an apodization period of 25 µm.
Figure 8B:
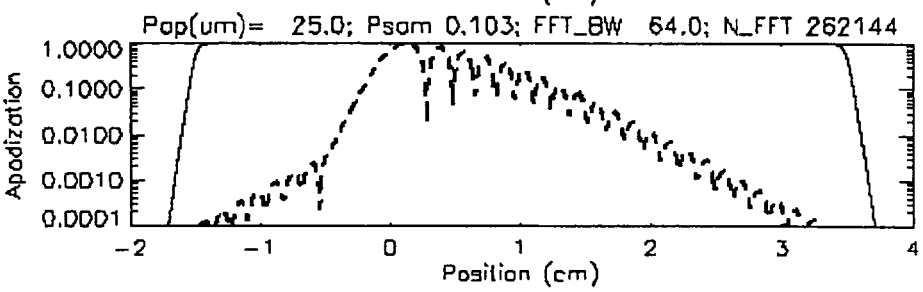
Figure 8C:
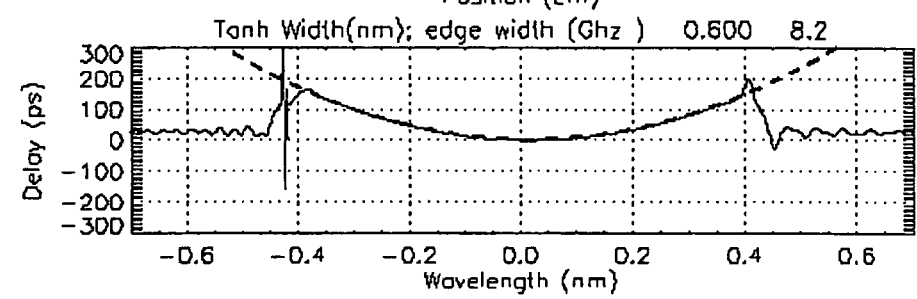
Figure 8D:
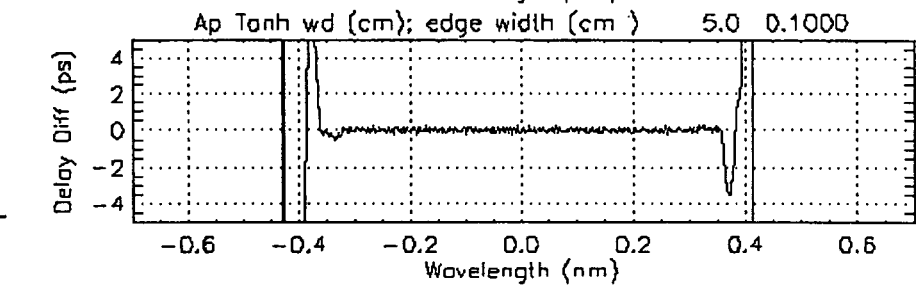
Figure 8E:
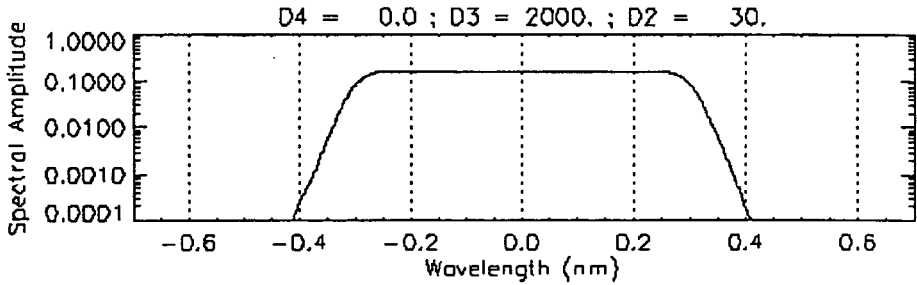
Figure 9A:
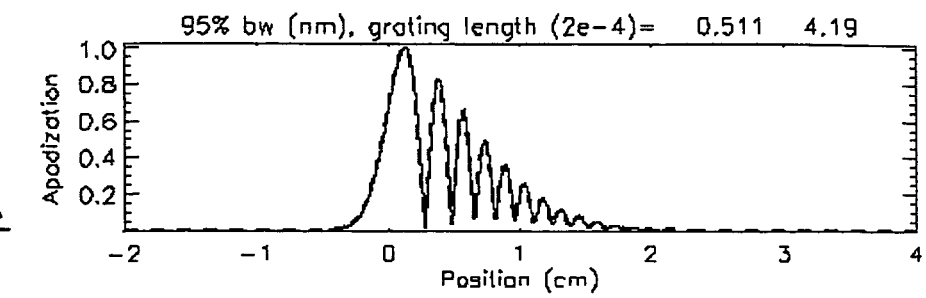
FIGS. 9A to 9E are graphic representations of the apodization, delay, delay difference and spectral amplitude for a nonlinearly chirped FBG, with an apodization period of 100 µm.
Figure 9B:
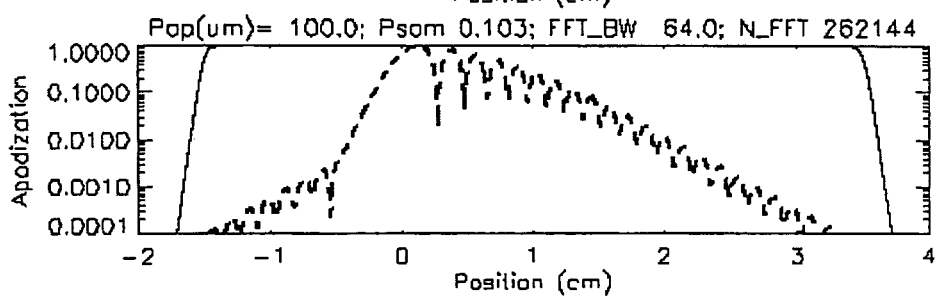
Figure 9C:
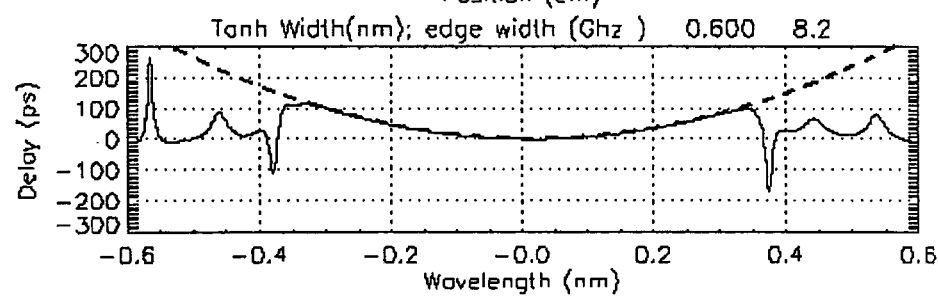
Figure 9D:
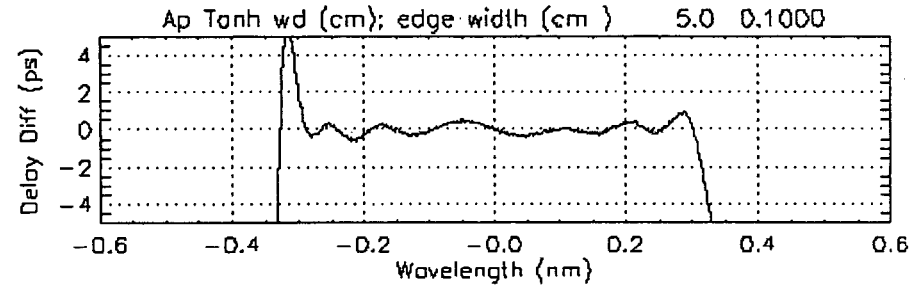
Figure 9E:
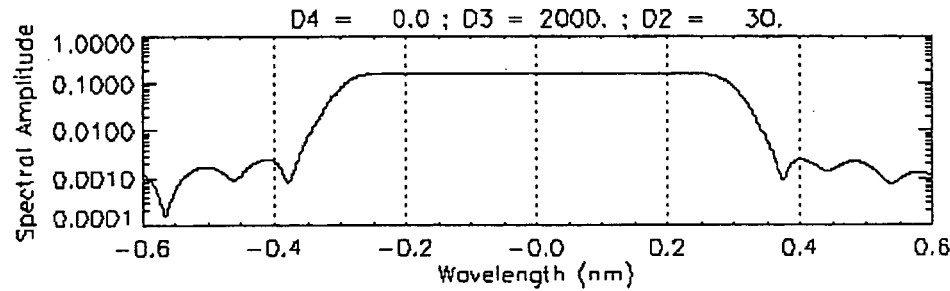

FIGS. 7A to 7E and 8A to 8E show calculations of phase-only apodization of nonlinearly chirped single channel gratings. For FIGS. 7A to 7E the apodization period is 50 μm, and the dispersion varies linearly over the channel bandwidth according to $D=(-500 \text{ ps/nm})+(800 \text{ ps/nm}^2)\Delta\lambda$. In FIGS. 8A to 8E the apodization period is 25 μm, and the dispersion is $D=(-30 \text{ ps/nm})+(2000 \text{ ps/nm}^2)\Delta\lambda$. The plots are similar to those above, but FIGS. 7A and 8A show the desired and achieved apodization profiles on a linear scale, whereas FIGS. 7B and 8B show the desired apodization (dashed) and actual constant $\Delta n(x)$, with tapers at the ends, on a log scale.

Note that in FIGS. 8A and 8B the target apodization profile has very dramatic oscillations from maximum to near zero, and thus is a rigorous test of the phase-only apodization method. In FIGS. 7D and 8D one sees again that the group delay is indistinguishable from the desired quadratic over the central portion of the reflectivity channel. As mentioned, the apodization period used is 25 μm in the case of FIGS. 8A to 8E, but if one increases this period, one starts to observe errors in the calculated spectrum. This effect is shown in FIGS. 9A to 9E, which is the same grating design as in FIGS. 8A to 8E, except that the phase apodization period has been taken as 100 μm. Modest but significant group delay errors can be seen in the channel center as well as amplitude error in the wings of the reflectivity. This appears to result from the rapid oscillations in the desired apodization profile. The phase modulation amplitude $\phi_0(x)$ can no longer be considered to vary slowly over a period $P_A$ of the apodization. This rapidly varying amplitude $\phi_0(x)$ produces a widening of the spurious sidebands that now overlap with the central channel. In order to eliminate this interference, it is then necessary to move the spurious sidebands further away from the spectral region of interest by shortening the period $P_A$ of the phase apodisation. If the apodization period cannot be reduced, the phase profile $\phi_0(x)$ can be designed with a different approach than prescribed by Eq. (15). For example, a nonlinear optimization iterative process can be used, such as the simulated thermal annealing, simplex, Gerchberg-Saxton, and other optimization methods described in U.S. Pat. No. 6,654,521 and U.S. patent application Ser. No. 09/757,386, whereby the complex reflectivity spectrum is calculated at each iteration and the phase profile $\phi_0(x)$ and/or the underlying grating phase $\phi_g(x)$ is varied until the desired complex reflectivity is achieved to a desired level of accuracy.

Figure 10A:
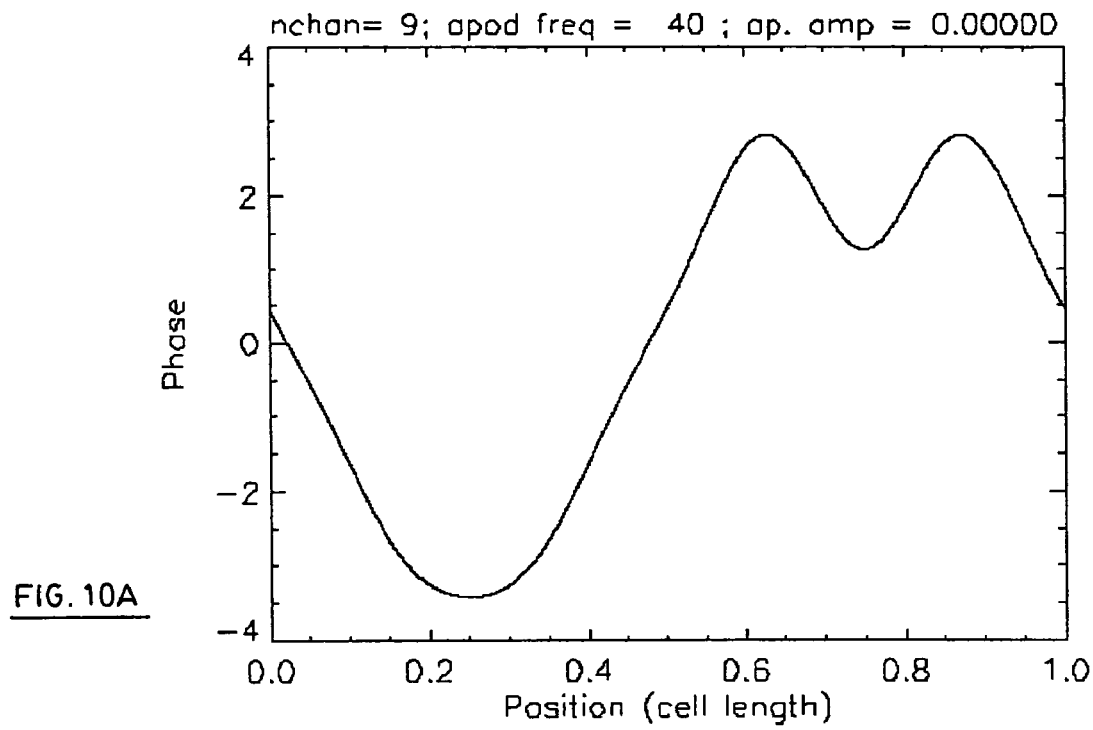
FIG. 10A (PRIOR ART) is a graphic representation of the periodic phase of a 9-channel phase-only sampled FBG, which generates the uniform 9 central channels.
Figure 10B:
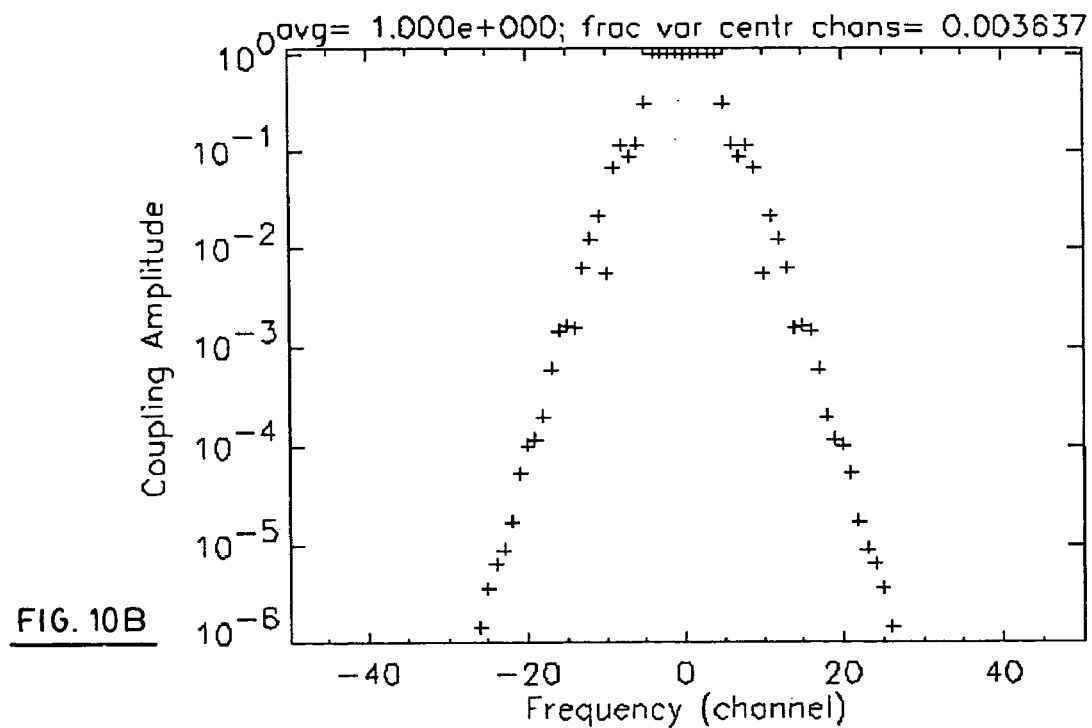
FIG. 10B (PRIOR ART) shows the spectral amplitude of the channels generated by the sampling.
Figure 11A:
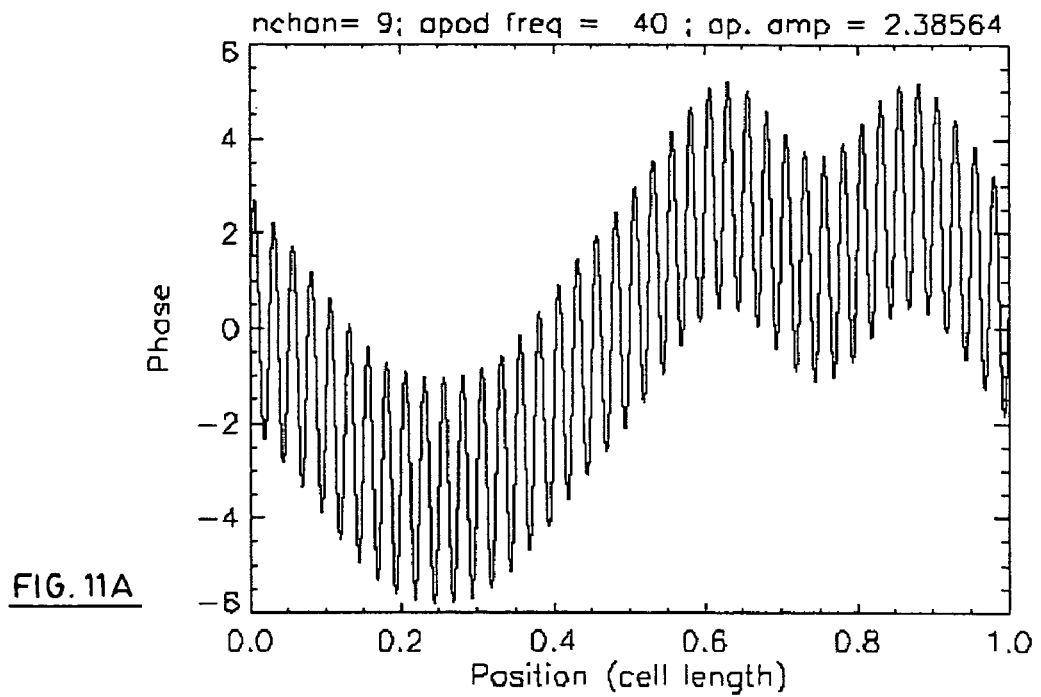
FIGS. 11A and 11B are graphic representations similar to those of FIGS. 10A and 10B, where phase-only apodization has been added to the FBG, the phase apodization period being of about 25 µm and amplitude of ±2.3856 rad.
Figure 11B:
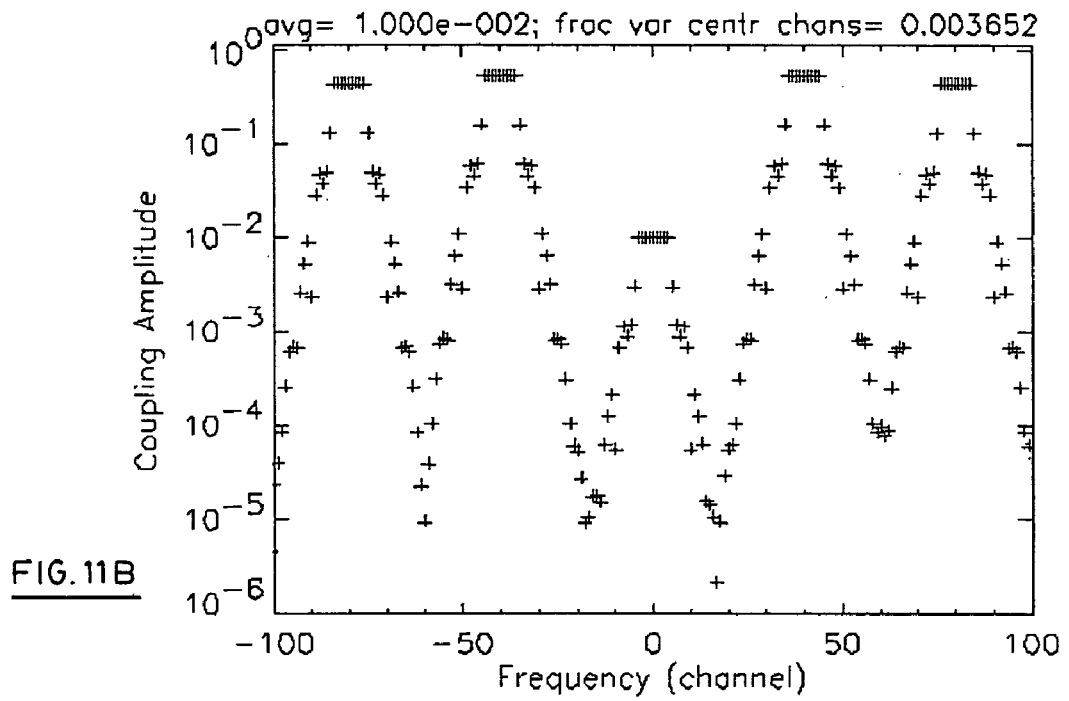
Figure 12A:
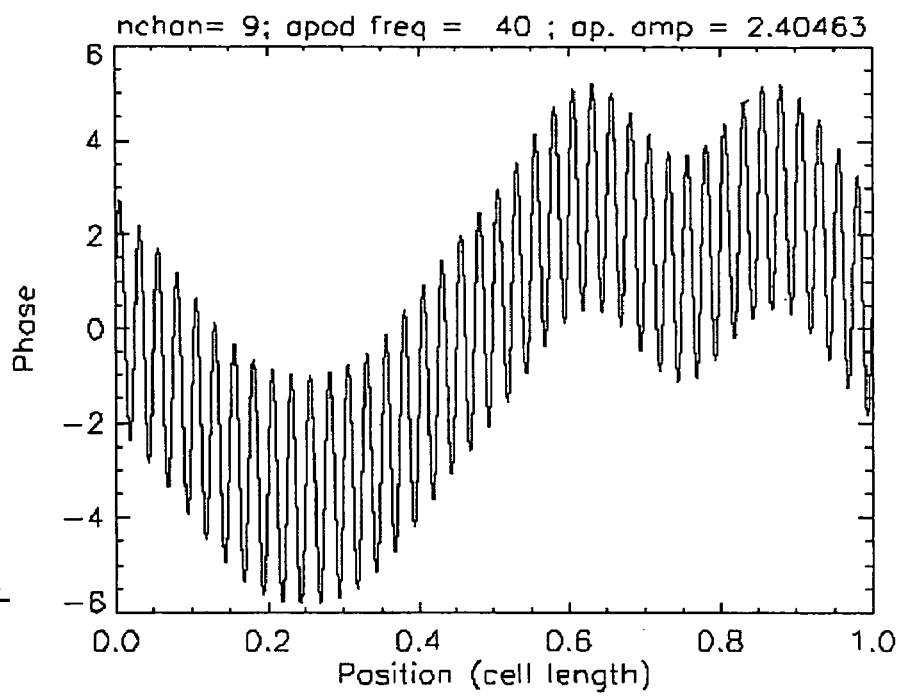
FIGS. 12A and 12B are graphic representations similar to those of FIGS. 10A and 10B, where phase-only apodization has been added to the FBG, the phase apodization period being of about 25 µm and amplitude of ±2.4046 rad.
Figure 12B:
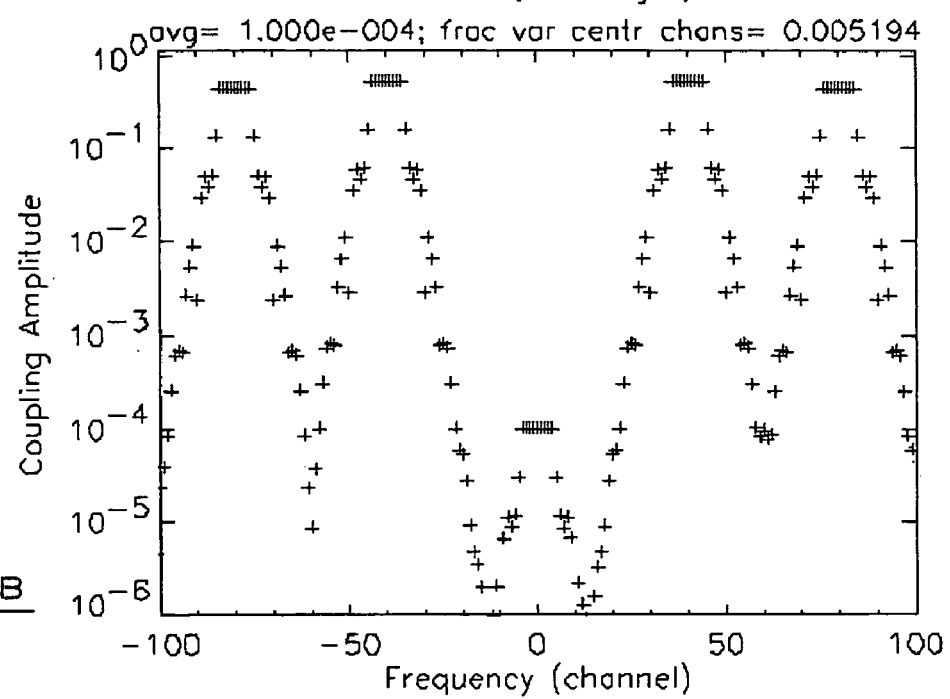

As discussed in previous U.S. Pat. No. 6,654,521 and U.S. patent application Ser. No. 09/757,386, a periodic phase included in the grating design can be used to "sample" the FBG and thereby generate a series of periodically spaced channels that can be adapted for use in a commercial WDM system. FIGS. 10A and 10B respectively show such a periodic phase that has been designed to generate 9 uniform channels, and the spectral amplitude of the channels generated by the sampling. The uniformity of the 9 central channels is better than 1%, but many unused 'extra' channels are also generated. The phase apodization method may be used in conjunction with the "phase sampling" to reduce the amplitude of all 9 of these channels by adding a periodic apodization phase of sufficiently high frequency such that the spurious 'apodization channels' are adequately spaced away from the desired central 9 channels, and therefore do not cause noticeable interference. Thus one would have an index modulation given by $$n(x)=n_{eff}+\Delta n_0 Re\{\exp[i(k_{g0}x+\phi_g(x)+\phi_{Samp}(x)+\phi_0(x)\sin(2\pi x/P_A))]\} \quad (24)$$

where $\phi_{Samp}(x)$ is the periodic sampling phase, and $\phi_g(x)$ is the underlying phase corresponding to the chirp common to all the channels. The period of $\phi_{Samp}(x)$, $P_{Samp}$ determines the spacing of the central channels according to $\Delta v_{Samp}=c/2n_g P_{Samp}$. For example, if the sampling period is about 1.03 mm, then the channel spacing $\Delta v$ is about 100 GHz, a standard ITU spacing for WDM channels. Phase-only apodization of a 9 channel spectrum generated by the phase of FIG. 10A and according to Eq. (24) is demonstrated in FIGS. 11A, 11B, 12A and 12B, where the apodization phase amplitude is applied as per Eq. (15). The apodization phase amplitude is set to $\phi_0=2.386$ rad for FIGS. 11A and 11B and $\phi_0=2.4046$ rad for FIGS. 12A and 12B, so as to reduce the amplitude of the central 9 channels to $10^{-2}$ and $10^{-4}$ of the maximum, respectively. The phase apodization is seen to impact equally on all 9 channels. Note that as the amplitude is decreased, the interference from the unwanted channels in the wings generated from the spurious 'apodization channels' becomes more of an issue. This constrains the apodization frequency to be large enough so that this potential overlap is not significant. In this case, the apodization period $P_A \sim 25$ μm corresponds to a 40 channel (at 100 GHz spacing or 4 THz) shift of the apodization channels, which is seen to be adequate to obtain good uniformity of the 9 channels at the $10^{-4}$ level. As one increases the channel count of the desired central band, then the apodization period will need to be decreased to ensure adequate separation between the desired channels and the spurious apodization channels.

Figures 13A, 13B:
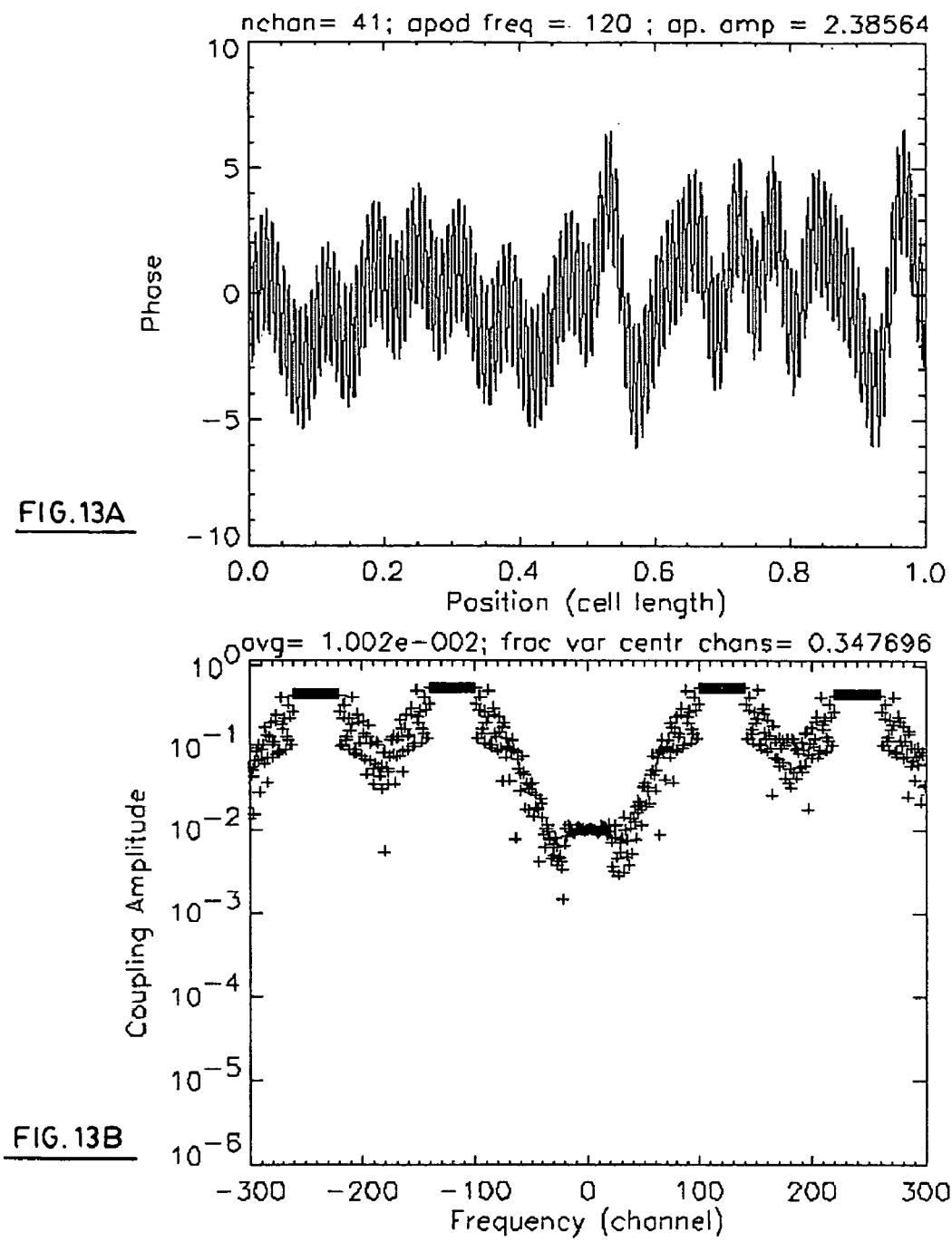
FIGS. 13A and 13B are graphic representations of the phase and coupling amplitude for a 41-channel FBG with phase-only sampling and apodization, the apodization phase having a period of about 8.3 µm and an amplitude of ±2.386 rad.
Figure 14A:
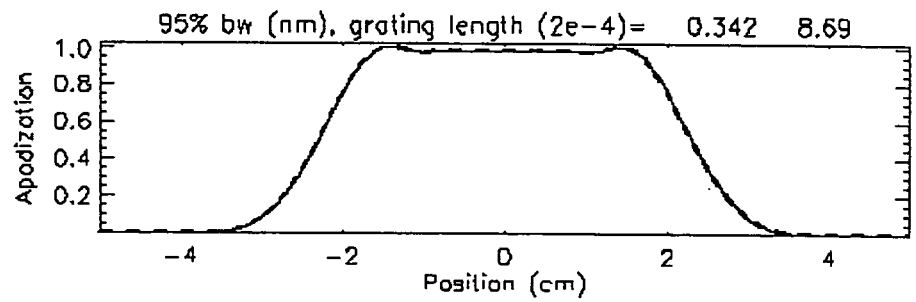
FIGS. 14A and 14B are graphic representations of the apodization vs position for a 9-channel linearly chirped phase-only sampled FBG having an apodization period of 25 µm.
Figure 14B:
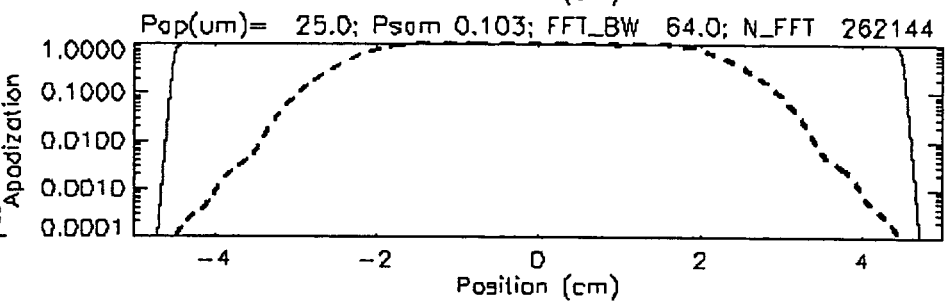
Figure 15A:
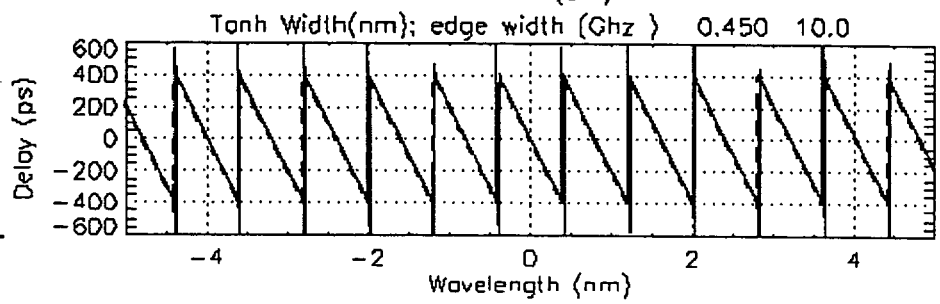
FIGS. 15A to 15F are graphic representations, for all channels and the central channel only, of the delay, delay difference and spectral amplitude of the FBG of FIGS. 14A and 14B.
Figure 15B:
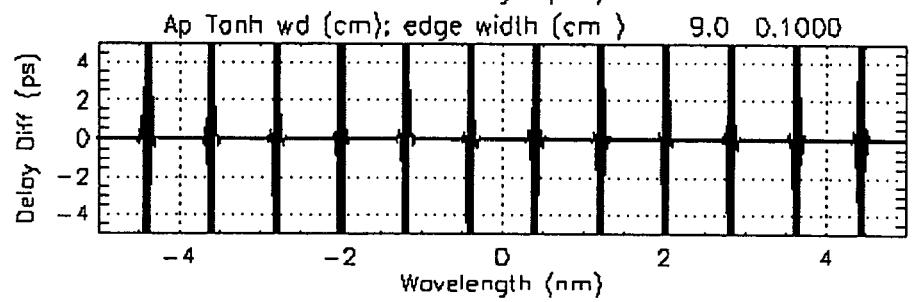
Figure 15C:
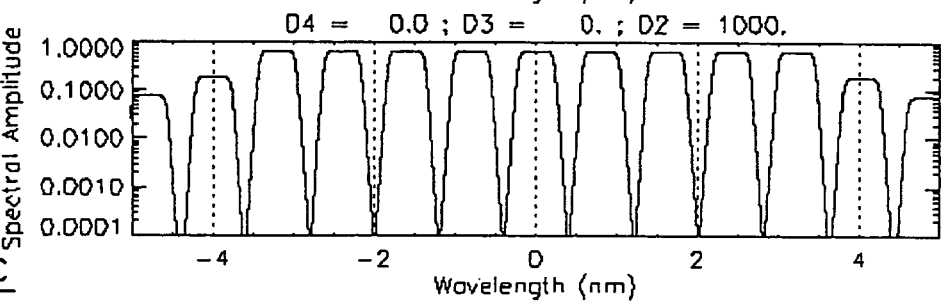
Figure 15D:
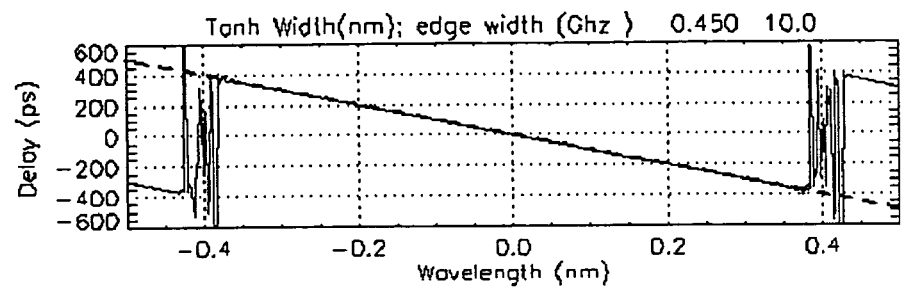
Figure 15E:
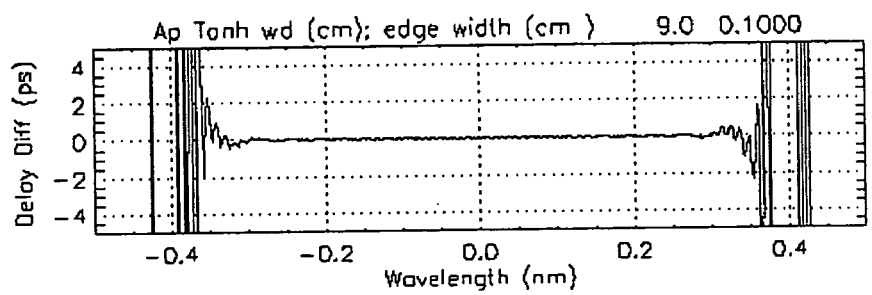
Figure 15F:
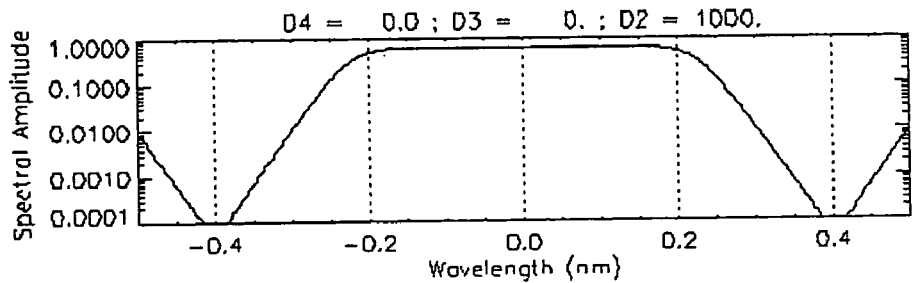
Figure 16A:
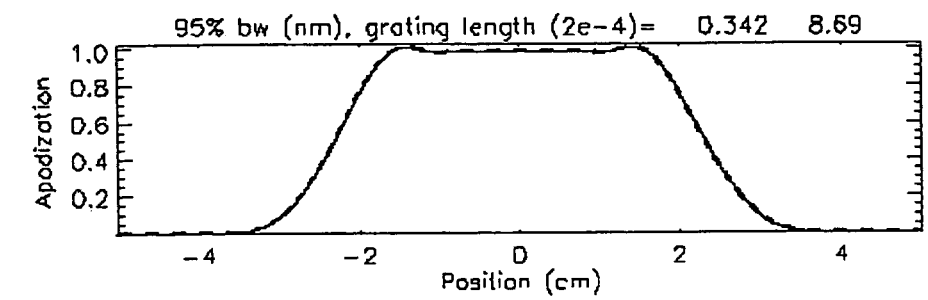
FIGS. 16A and 16B are graphic representations of the apodization vs position for a 41-channel linearly chirped phase-only sampled FBG having an apodization period of about 6.7 µm.
Figure 16B:
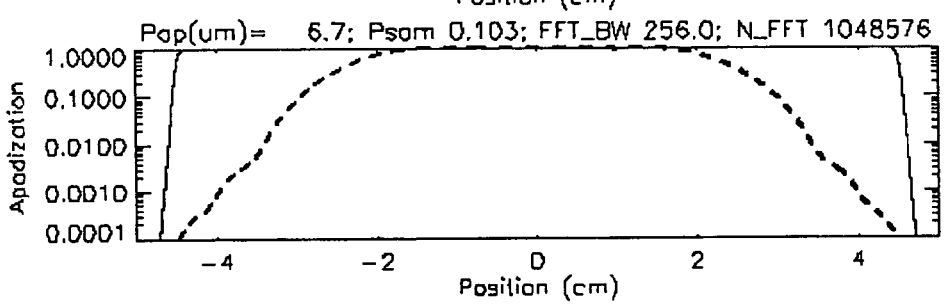
Figure 17A:
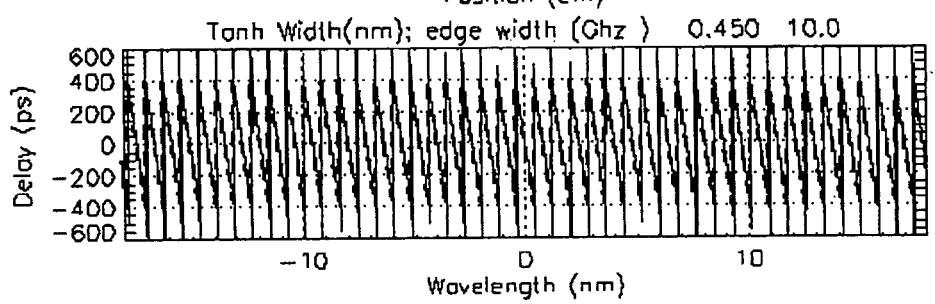
FIGS. 17A to 17F are graphic representations, for all channels and the central channels only, of the delay, delay difference and spectral amplitude of the FBG of FIGS. 16A and 16B.
Figure 17B:
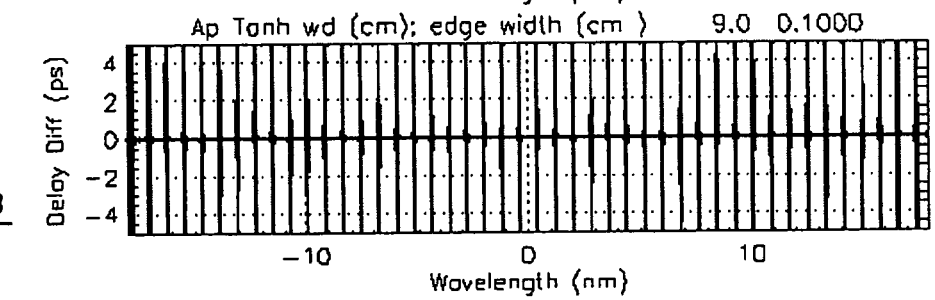
Figure 17C:
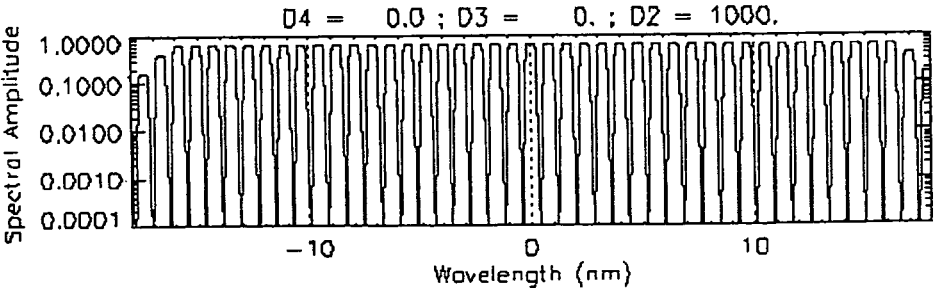
Figure 17D:
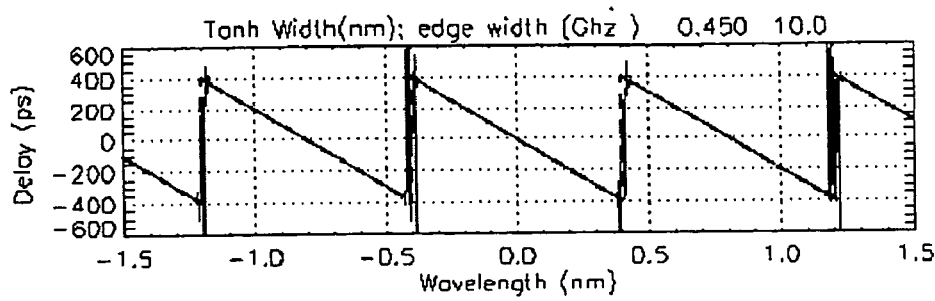
Figure 17E:
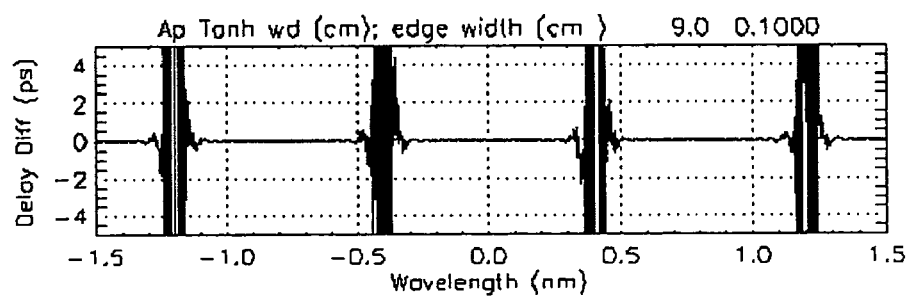
Figure 17F:
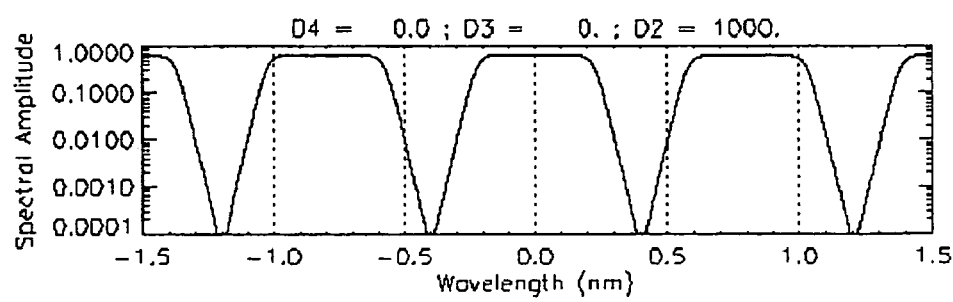

An example of this characteristic is shown in FIGS. 13A and 13B, for a 41 channel phase-only sampled grating apodized to a target level of $10^{-2}$. The phase apodization applied is uniform with amplitude $\phi_0=2.386$ rad and period $P_A=8.3$ μm, corresponding to a shift of the apodization channels of about 124 channels (12.4 THz). Because this shift is insufficient, one observes significant nonuniformity (>30%) in the amplitude of the center 41 channels, owing to interference from the spurious apodization channels. Simulations (see FIGS. 16A, 16B and 17A to 17F) show that a shift of about 154 channels (15.4 THz frequency shift, or apodization period $P_A \sim 6.7$ μm) is sufficient to achieve adequate uniformity.

In the above calculations for 9 and 41 channel sampled gratings of FIGS. 10A to 13B, $\phi_g(x)$ is taken to be zero and one obtains identical channels each originating from a uniform grating, and thus only the overall channel amplitudes are plotted. If instead $\phi_g(x)$ is chosen to give a linear chirp, i.e. a quadratic phase, then one obtains a multi-channel grating with equal dispersion in each channel. An example of this is shown in FIGS. 14A, 14B and 15A to 15F, where $\phi_g(x)$ is chosen to correspond to a dispersion of D=1000 ps/nm. It can be seen that 9 uniform channels with identical linear group delay are obtained. The deviation of the group delay from the desired linear design is seen to be negligible in the single channel plot of FIG. 15E. Here again the apodization period selected is $P_A$=25 μm (40 channel shift), which is seen to be adequate to ensure good uniformity and negligible group delay ripple in each of the desired channels.

Similar calculations are shown in FIGS. 16A, 16B and 17A to 17F, but in this case the phase-only sampling is designed for 41 central channels. As a result, a much larger offset for the spurious apodization channels is required to avoid interference between channels, and thus undesirable non-uniformity and group delay ripple. Therefore, an apodization period of $P_A$~6.7 μm is used in these calculations, which corresponds to an apodization frequency of about 15.4 THz or an offset of about 15.4 channels. From the above-referred figures one sees that the apodization with a 15.4 THz offset is sufficient to ensure good uniformity and negligible group delay ripple in each of the desired channels.

In summary, a sinusoidal phase component is applied to a phase mask in order to precisely control the apodization characteristics of the photoinduced FBG. The phase modification is periodical but does not necessarily need to be sinusoidal. The present invention therefore provides a method to control the apodization amplitude of the channel(s) of interest by a phase-only modification to the FBG and/or mask. This approach requires that the reduction of apodization and reflectivity in the channel(s) of interest be accompanied by a redistribution of reflectivity to another spectral region, which by design should be of no concern.

It should be noted that the analysis of sinusoidal phase apodization and its implementation in the mask is based on the approximate relationship found between the mask and fiber phase and disclosed in U.S. Pat. No. 6,654,521, as described above in Eqs. (19) and (20). In practice this approximation may be inadequate, especially for higher apodization frequencies, where a more complete diffraction analysis is required. However, regardless of the analytic method, one can always perform an experimental calibration of the effective apodization obtained as a function of the periodic (perhaps sinusoidal) apodization phase amplitude. Such a calibration would then replace the analytic result of Eq. (22), or some more sophisticated diffraction calculation. The experimental calibration curve obtained would then replace FIG. 2A, and an empirically calibrated, modified version of Eq. (15) could then be used to design $\phi_0(x)$ and thus the mask for any given desired apodization profile, in a manner similar to that described by Eqs (14) to (17). In addition, the phase modulation for apodization and the phase of the underlying grating design may be optimized to achieve the desired apodization and FBG spectral response by a number of well known techniques, such as those described to optimize the sampling spectrum in U.S. Pat. No. 6,654,521 and U.S. patent application Ser. No. 09/757,386.

It may also be beneficial to combine the proposed technique with prior art concepts such as variations of the mask groove depth or duty ratio along the length of the grating. This approach may be helpful at the very ends of the grating, where some type of amplitude apodization may be helpful in avoiding spurious FBG reflections owing to the abrupt end of the phase apodization. It should be emphasized that apodization of the grating ends by a means other than phase-only apodization is not a required aspect of the invention, but may be beneficial in some circumstances.

Of course, numerous changes or modifications could be made to the embodiments above without departing from the scope of the present invention as defined in the appended claims.

The invention claimed is:

1. A phase mask for photoinducing a Bragg grating into a photosensitive medium, said Bragg grating having grating fringes defining a light reflection spectrum including a spectral region of interest, the phase mask comprising:
a plurality of grating corrugations positioned along said mask according to a periodic distribution, said periodic distribution having a periodic apodization phase component designed to apodize the grating fringes of the Bragg grating reflecting light within the spectral region of interest by generating spurious reflection features in said reflection spectrum outside of said spectral region of interest.

2. The phase mask according to claim 1, wherein the grating corrugations are of uniform height.

3. The phase mask according to claim 1, wherein the periodic distribution further comprises a chirp phase component.

4. The phase mask according to claim 1, wherein the periodic distribution further comprises a sampling phase component.

5. The phase mask according to claim 1, wherein said apodization phase component has a sinusoidal variation.

6. The phase mask according to claim 1, wherein the periodic distribution is designed so that the spectral region of interest is the telecommunication C-band.

7. The phase mask according to claim 6, wherein said period of the apodization phase component is of about 25 μm or less.

8. A method for photoinducing a Bragg grating into a photosensitive medium, said Bragg grating having grating fringes defining a light reflection spectrum including a spectral region of interest, the method comprising steps of:
a) providing a phase mask having a plurality of grating corrugations positioned therealong according to a periodic distribution, said periodic distribution having a periodic apodization phase component designed to apodize the grating fringes of the Bragg grating reflecting light within the spectral region of interest by generating spurious reflection features in said reflection spectrum outside of said spectral region of interest;
b) disposing the photosensitive medium along the grating corrugations in close proximity to said phase mask; and
c) projecting actinic radiation through said phase mask, said actinic radiation being diffracted by the grating corrugations to generate the Bragg grating, said Bragg grating being photoinduced into the photosensitive medium.

9. A system for photoinducing a Bragg grating into a photosensitive medium, said Bragg grating having grating fringes defining a light reflection spectrum including a spectral region of interest, the system comprising:
a phase mask having a plurality of grating corrugations positioned therealong according to a periodic distribution, said periodic distribution having a periodic apodization phase component designed to apodize the grating fringes of the Bragg grating reflecting light within the spectral region of interest by generating spurious reflection features in said reflection spectrum outside of said spectral region of interest, the photosensitive medium being disposed along the grating corrugations in close proximity to said phase mask; and light projection means for projecting actinic radiation through said phase mask, said actinic radiation being diffracted by the grating corrugations to generate the Bragg grating, said Bragg grating being photoinduced into the photosensitive medium.

10. The system according to claim 9, wherein the grating corrugations are of uniform height.

11. The system according to claim 9, wherein the periodic distribution further comprises a chirp phase component.

12. The system according to claim 9, wherein the periodic distribution further comprises a sampling phase component.

13. The system according to claim 9, wherein said apodization phase component has a sinusoidal variation.

14. The system according to claim 9, wherein the periodic distribution is designed so that the spectral region of interest is the telecommunication C-band.

15. The system according to claim 14, wherein said period of the apodization phase component is of about 25 μm or less.

16. The system according to claim 9, wherein the light projection means comprise a UV light source generating said acitinic radiation.

17. The system according to claim 16, wherein said light projection means further comprise a scanning assembly for scanning said actinic radiation along said phase mask.

18. The system according to claim 16, wherein the light projection means further comprises beam shaping means for shaping said actinic radiation into a beam large enough to write said Bragg grating in a single exposition.

* * * * *